(12) United States Patent
Yang

(10) Patent No.: US 8,565,741 B2
(45) Date of Patent: Oct. 22, 2013

(54) MOBILE TERMINAL AND INFORMATION PROCESSING METHOD THEREOF

(75) Inventor: Seung Wan Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 579 days.

(21) Appl. No.: 12/409,171

(22) Filed: Mar. 23, 2009

(65) Prior Publication Data

US 2010/0105362 A1    Apr. 29, 2010

(30) Foreign Application Priority Data

Oct. 23, 2008    (KR) ........................ 10-2008-0103944

(51) Int. Cl.
  *H04L 29/08*    (2006.01)
(52) U.S. Cl.
  USPC .................. 455/414.4; 455/414.1; 455/414.2; 455/414.3; 455/466
(58) Field of Classification Search
  USPC .................................... 455/414.1–414.4, 466
  See application file for complete search history.

(56) References Cited

U.S. PATENT DOCUMENTS

| 7,221,387 | B2 * | 5/2007 | Fernandez et al. | 348/14.08 |
| 7,583,957 | B2 * | 9/2009 | Lee | 455/414.3 |
| 7,895,625 | B1 * | 2/2011 | Bryan et al. | 725/46 |
| 2004/0198435 | A1 * | 10/2004 | Gauld et al. | 455/556.1 |
| 2005/0044260 | A1 * | 2/2005 | Abramson et al. | 709/233 |
| 2006/0195790 | A1 * | 8/2006 | Beaupre et al. | 715/727 |
| 2007/0042710 | A1 * | 2/2007 | Mahini et al. | 455/3.03 |
| 2007/0078986 | A1 * | 4/2007 | Ethier et al. | 709/227 |
| 2009/0132093 | A1 * | 5/2009 | Arneson et al. | 700/282 |
| 2010/0083182 | A1 * | 4/2010 | Liu et al. | 715/843 |
| 2011/0088063 | A1 * | 4/2011 | Ben-Romdhane et al. | 725/46 |
| 2011/0173672 | A1 * | 7/2011 | Angiolillo et al. | 725/118 |
| 2011/0276993 | A1 * | 11/2011 | Ferguson | 725/30 |

\* cited by examiner

Primary Examiner — Lester Kincaid
Assistant Examiner — Mehmood B Khan
(74) Attorney, Agent, or Firm — Birch, Stewart, Kolasch & Birch, LLP

(57) ABSTRACT

A method of controlling a mobile terminal, and which includes acquiring channel information of a broadcasting program received by at least one other mobile terminal through a client program, arranging and displaying the acquired channel information according to a specific standard, receiving a selection signal corresponding to a selection at least one channel information item from the displayed channel information, and receiving and displaying the broadcasting program corresponding to the selected channel information item.

15 Claims, 31 Drawing Sheets

MOBILE TERMINAL AND INFORMATION PROCESSING METHOD THEREOF

The present application claims priority to Korean Application No. 10-2008-0103944 filed in Korea on Oct. 23, 2008, the entire contents of which are hereby incorporated by reference in their entirety.

BACKGROUND OF THE INVENTION

1. Field of the Invention

The present invention relates to a mobile terminal and corresponding information processing method for acquiring channel information of a broadcasting program being received by another mobile terminal such that multiple users can watch the same broadcasting program.

2. Discussion of the Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

In addition, terminals can be divided into mobile terminals and stationary terminals. The mobile terminals can be classified into handheld terminals and vehicle mount terminals according to whether users can personally carry the terminals.

Thus, many users now watch broadcasting programs such as sporting events, news programs, television shows, etc. using their mobile terminal. However, the additional features provided with respect to broadcast programs are very limited, which inconveniences the user.

SUMMARY OF THE INVENTION

Accordingly, one object of the present invention is to address the above-noted and other drawbacks of the present invention.

Another object of the present invention is to provide a mobile terminal and corresponding information processing method for acquiring channel information of a broadcasting program being received by another mobile terminal such that multiple users can watch the same broadcasting program.

Yet another object of the present invention is to provide a mobile terminal and corresponding information processing method for arranging the channel information according to a predetermined standard to the improve convenience of using the mobile terminal.

To achieve these and other advantages and in accordance with the purpose of the present invention, as embodied and broadly described herein, the present invention provides in one aspect a method of controlling a mobile terminal, and which includes acquiring channel information of a broadcasting program received by at least one other mobile terminal through a client program, arranging and displaying the acquired channel information according to a specific standard, receiving a selection signal corresponding to a selection at least one channel information item from the displayed channel information, and receiving and displaying the broadcasting program corresponding to the selected channel information item.

In another aspect, the present invention provides a mobile terminal including an Internet module configured to connect to the Internet, a controller configured to acquire channel information of a broadcasting program received by at least one other mobile terminal through a client program connected to the Internet, a display unit configured to arrange and display the acquired channel information according to a specific standard, and an input unit configured to select at least one channel information item from the displayed channel information. Further, the controller is further configured to receive the broadcasting program corresponding to the selected channel information item and to control the display unit to display the broadcasting program.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, the embodiments are provided so that this disclosure will be thorough and complete, and will fully convey the concept of the invention to those skilled in the art.

Hereinafter, a mobile terminal relating to an embodiment of the present invention will be described below in more detail with reference to the accompanying drawings. In addition, the mobile terminal according to embodiments of the present invention can include a cellular phone, a smart phone, a laptop computer, a digital broadcasting terminal, personal digital assistants (PDA), a portable multimedia player (PMP), a navigation system and so on.

Figure 1:
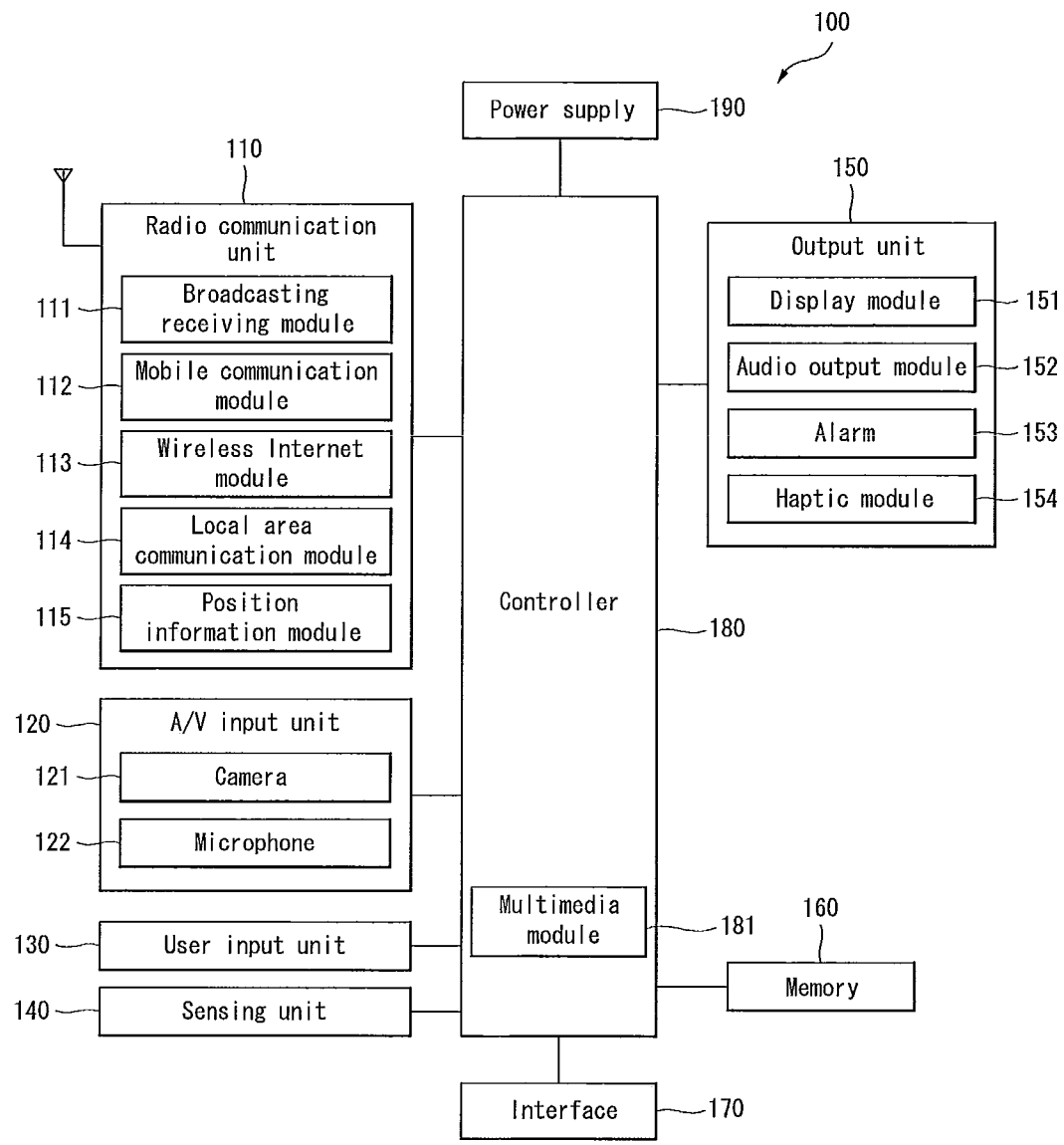
FIG. 1 is a block diagram of a mobile terminal according to an embodiment of the present invention.

FIG. 1 is a block diagram of a mobile terminal 100 according to an embodiment of the present invention. As shown, the mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 can be included or excluded as necessary and the number of components included in the mobile terminal can be varied. Further, the terms module and unit may be used interchangeably when describing some of the components.

In addition, the radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

Also, the broadcasting related information can be information on a broadcasting channel, a broadcasting program or a broadcasting service provider, and can be provided even through a mobile communication network. In this instances, the broadcasting related information can be received by the mobile communication module 112.

The broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

Further, the broadcasting receiving module 111 receives broadcasting signals using various broadcasting systems. For example, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H system and the integrated services digital broadcast-terrestrial (ISDB-T) systems. The broadcasting receiving module 111 can also be constructed to be suited to broadcasting systems providing broadcasting signals other than the above-described digital broadcasting systems. In addition, the broadcasting signals and/or broadcasting related information received through the broadcasting receiving module 111 can be stored in the memory 160.

Further, the mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

Also, the wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

Further, the local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to a latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

Further, the image frames processed by the camera 121 can be stored in the memory 160 or transmitted to an external device through the radio communication unit 110. The mobile terminal 100 can also include at least two cameras according to constitution of the terminal.

In addition, the microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. Also, the microphone 122 can employ various noise removal algorithms for removing noise generated when the external audio signal is received.

Further, the user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as an open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone, can sense whether the power supply 190 supplies power and whether the interface 170 is connected to an external device, etc. The sensing unit 140 can also include a proximity sensor.

Further, the output unit 150 generates visual, auditory or tactile output and can include the display unit 151, an audio output module 152, an alarm 153 and a haptic module 154. The display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display, a three-dimensional display, a transparent display, etc.

That is, some of these displays can be of a transparent type or a light transmission type, which is referred to as a transparent display. In more detail, the transparent display includes a transparent liquid crystal display. The rear structure of the display unit 151 can also be of the light transmission type. Accordingly, a user can see an object located behind the body of the mobile terminal 100 through the display unit 151.

The mobile terminal 100 can also include at least two display units 151 according to constitution of the terminal. For example, the mobile terminal 100 can include a plurality of displays that are arranged on a single face at a predetermined distance or integrated. The plurality of displays can also be arranged on different sides of the terminal.

When the display unit 151 and a sensor sensing touch (referred to as a touch sensor hereinafter) form a layered structure, which is referred to as a touch screen hereinafter, the display unit 151 can be used as an input device in addition to an output device. Further, the touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can also be constructed such that it can sense pressure of touch as well as the position and area of touch.

When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring again to FIG. 1, the proximity sensor included in the sensing unit 140 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor also has a lifetime longer than that of a contact sensor and has wide applications.

Further, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

Further, a capacitive touch screen is constructed such that a proximity of a pointer is detected through a variation in an electric field according to the proximity of the pointer. In this instance, the touch screen (touch sensor) can be classified as a proximity sensor.

In addition, an action of approaching the pointer to the touch screen while the pointer is not in contact with the touch screen such that location of the pointer on the touch screen is recognized will be referred to as a "proximity touch" and an action of bring the pointer into contact with the touch screen will be referred to as a "contact touch" in the following description. Further, a proximity touch point of the pointer on the touch screen corresponds to a point of the touch screen to which the pointer corresponds perpendicularly to the touch screen when the pointer proximity-touches the touch screen.

The proximity sensor also senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

Further, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating a generation of an event of the mobile terminal 100. Examples of events generated in the mobile terminal include receiving a call signal, receiving a message, inputting a key signal, inputting touch, etc. The alarm 153 can output signals in forms different from video signals or audio signals, for example, a signal for indicating generation of an event through vibration. The video signals or the audio signals can also be output through the display unit 151 or the audio output module 152.

Further, the haptic module 154 generates various haptic effects that the user can feel. A representative example of the haptic effects is vibration. The intensity and pattern of vibration generated by the haptic module 154 can also be controlled. For example, different vibrations can be combined and output or can be sequentially output.

In addition, the haptic module 154 can generate a variety of haptic effects including an effect of stimulus according to arrangement of pins vertically moving for a contact skin face, an effect of stimulus according to a jet force or sucking force of air through a jet hole or a sucking hole, an effect of stimulus of rubbing the skin, an effect of stimulus according to a contact of an electrode, an effect of stimulus using an electrostatic force and an effect according to a reproduction of cold and warmth using an element capable of absorbing or radiating heat in addition to vibrations.

The haptic module 154 can not only transmit haptic effects through direct contact, but also allow the user to feel haptic effects through kinesthetic sense of his or her fingers or arms. The mobile terminal 100 can also include at least two haptic modules 154 according to a constitution of the mobile terminal.

Further, the memory 160 can store a program for the operation of the controller 180 and temporarily store input/output data (for example, a phone book, messages, still images, moving images, etc.). The memory 160 can store data about vibrations and sounds in various patterns, which are output from when a touch input is applied to the touch screen.

The memory 160 can also include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

In addition, the interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 also controls the overall operation of the mobile terminal. For example, the controller 180 performs control and processing for voice communication, data communication and video telephony. The controller 180 can also include a multimedia module 181 for playing multimedia. The multimedia module 181 can be included in the controller 180 or be separated from the controller 180. The controller 180 can also perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some instances, the embodiments can be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
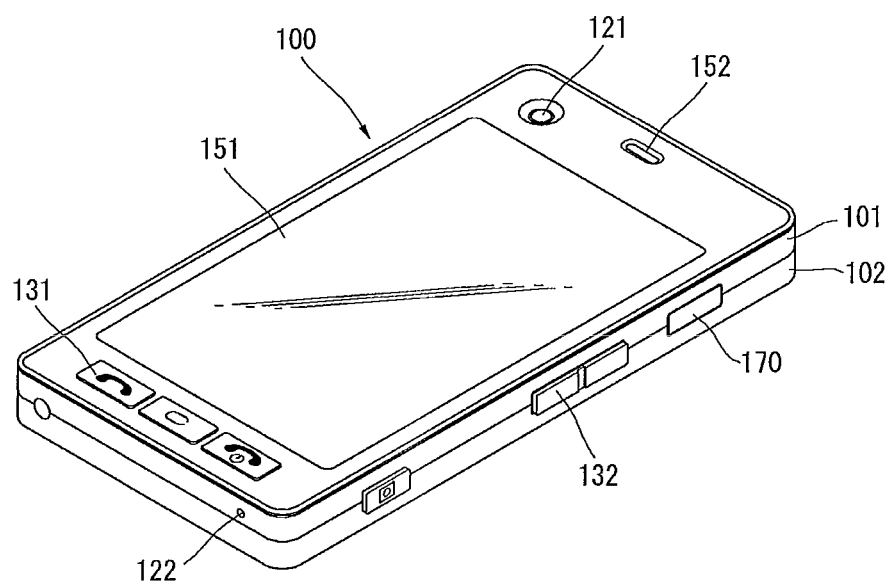
FIG. 2A is a front perspective view of the mobile terminal according to an embodiment of the present invention.

Next, FIG. 2A is a front perspective view of a mobile terminal or a handheld terminal 100 according to an embodiment of the present invention. In this example, the handheld terminal 100 has a bar type terminal body. However, the present invention is not limited to a bar type terminal and can be applied to terminals of various types including a slide type, folder type, swing type and swivel type terminals having at least two bodies that are relatively movably combined.

The terminal body includes a case (a casing, a housing, a cover, etc.) forming the exterior of the terminal 100. In the present embodiment, the case is divided into a front case 101 and a rear case 102. Various electronic components are arranged in the space formed between the front case 101 and the rear case 102. At least one middle case can also be additionally arranged between the front case 101 and the rear case 102. Further, the cases can be formed of plastics through injection molding or made of a metal material such as stainless steel (STS) or titanium (Ti).

The display unit 151, the audio output unit 152, the camera 121, user input units 131 and 132, the microphone 122 and the interface 170 can be arranged in the terminal body, specifically, in the front case 101. Also, the display unit 151 occupies most of the main face of the front case 101. The audio output unit 152 and the camera 121 are arranged in a region in proximity to one of both ends of the display unit 151, and the user input unit 131 and the microphone 122 are located in a region in proximity to the other end of the display unit 151. The user input unit 132 and the interface 170 are also arranged on the sides of the front case 101 and the rear case 102.

In addition, the user input unit 130 is operated to receive commands for controlling the operation of the handheld terminal 100 and in this example includes input units 131 and 132. The input units 131 and 132 can be referred to as manipulating portions and employ any tactile manner in which a user operates the input units 131 and 132 while having tactile feeling.

The input units 131 and 132 can receive various inputs. For example, the first input unit 131 receives commands such as a start, end and scroll commands and the second input unit 132 receives commands such as a volume control command for controlling the volume output the audio output unit 152 or a conversion command for converting the display unit 151 to a touch recognition mode.

Figure 2B:
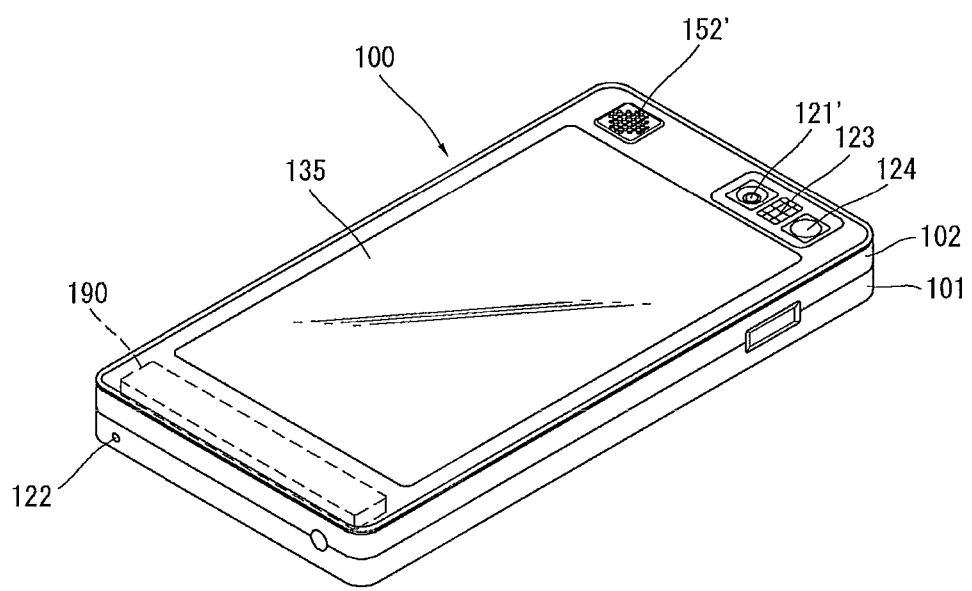
FIG. 2B is a rear perspective view of the mobile terminal according to an embodiment of the present invention.

Next, FIG. 2B is a rear perspective view of the handheld terminal shown in FIG. 2A according to an embodiment of the present invention. Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, the camera 121 preferably has low pixels such that it can capture an image of the face of a user and transmit the image to a receiving part during video telephony, while the camera 121' has high pixels because it captures an image of a general object and does not immediately transmit the image in many situations. The cameras 121 and 121' can also be attached to the terminal body such that they can be rotated or popped-up.

Further, a flash bulb 123 and a mirror 124 are additionally arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'.

An audio output unit 152' can be additionally provided on the rear side of the terminal body. Thus, the audio output unit 152' can achieve a stereo function with the audio output unit 152 shown in FIG. 2A and be used for a speaker phone mode when the terminal is used for a telephone call.

A broadcasting signal receiving antenna can also be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

Further, the power supply 190 for providing power to the handheld terminal 100 is set in the terminal body. The power supply 190 can be included in the terminal body or detachably attached to the terminal body.

As shown, a touch pad 135 for sensing touch can be additionally attached to the rear case 102. The touch pad 135 can be of a light transmission type as the display unit 151. In this instance, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

Further, the touch pad 135 operates in connection with the display unit 151 of the front case 101. The touch pad 135 can be located in parallel with the display unit 151 and behind the display unit 151. The touch panel 135 can also be identical to or smaller than the display unit 151 in size.

Figure 2C:
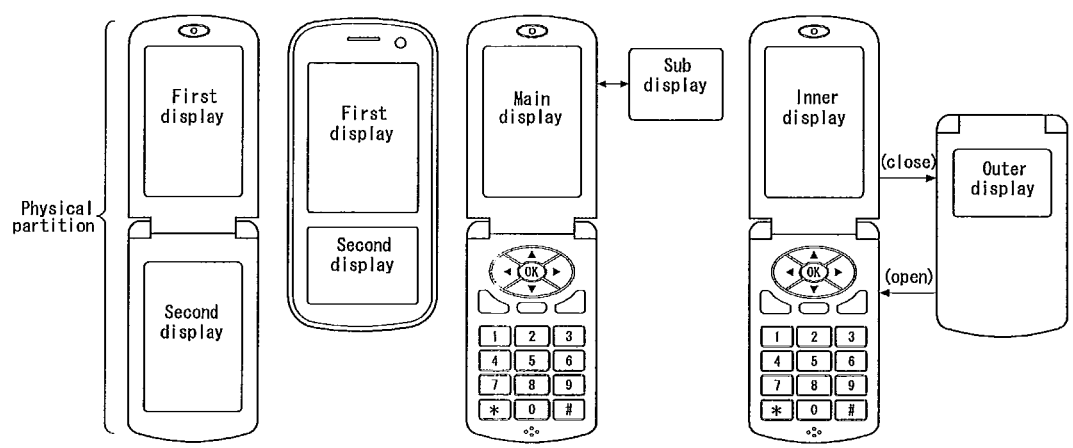
FIGS. 2C and 2D are overviews of the mobile terminal and display screens according to various embodiments of the present invention.
Figure 2D:
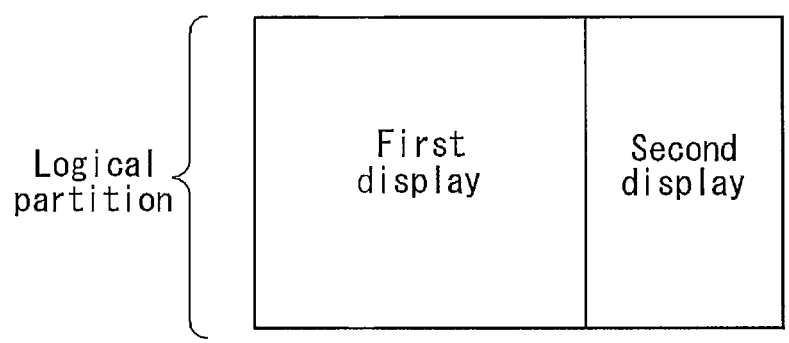

Next, FIGS. 2C and 2D illustrate the mobile terminal 100 and the display unit 151 according to various embodiments of the present invention. Referring to FIG. 2C, the display unit can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body.

The sub display is separated from the mobile terminal and detachably combined with the mobile terminal body through an interface to display data from the mobile terminal 100. The display unit can also include first and second displays which are logically separated from each other in a display panel, as illustrated in FIG. 2D.

Figure 3:
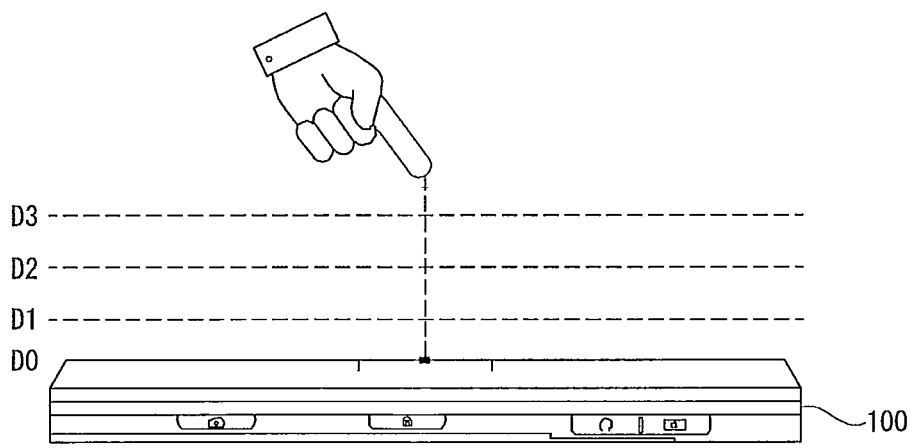
FIG. 3 is a conceptional view for explaining a proximity depth of a proximity sensor.

Next, FIG. 3 is a conceptional view for explaining a proximity depth of the proximity sensor. As shown in FIG. 3, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

In addition, the distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 3 shows the section of the touch screen in which proximity sensors capable of sensing three proximity depths are arranged. Proximity sensors capable of sensing less than three or more than four proximity depths can also be arranged in the touch screen.

In particular, when the pointer completely comes into contact with the touch screen (D0), this action is recognized as contact touch. When the pointer is located within a distance D1 from the touch screen, this action is recognized as proximity touch of a first proximity depth. Also, when the pointer is located in a range between the distance D1 and a distance D2 from the touch screen, this action is recognized as proximity touch of a second proximity depth.

In addition, when the pointer is located in a range between the distance D2 and a distance D3 from the touch screen, this action is recognized as proximity touch of a third proximity depth, and when the pointer is located at longer than the distance D3 from the touch screen, this action is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 4:
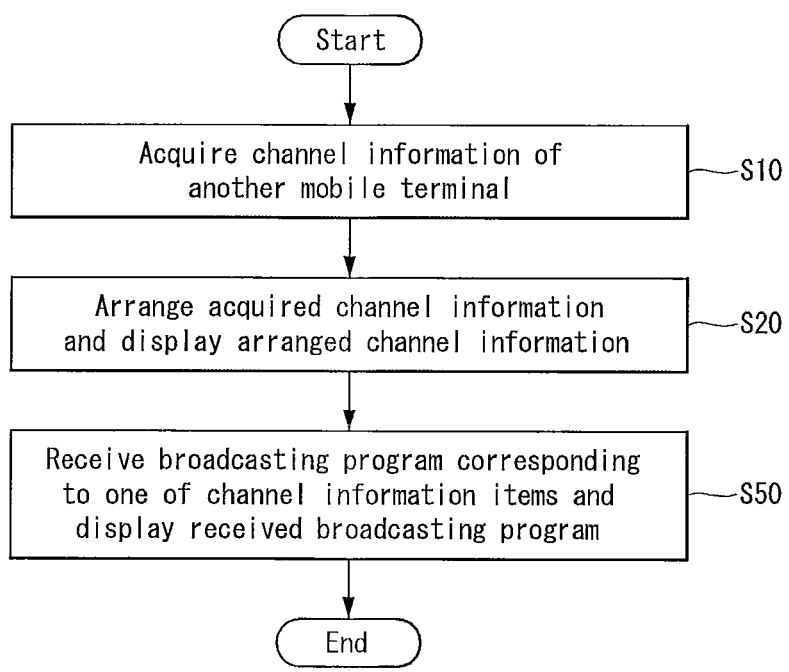
FIG. 4 is a flow chart illustrating an information processing method of a mobile terminal according to a first embodiment of the present invention.
Figure 5:
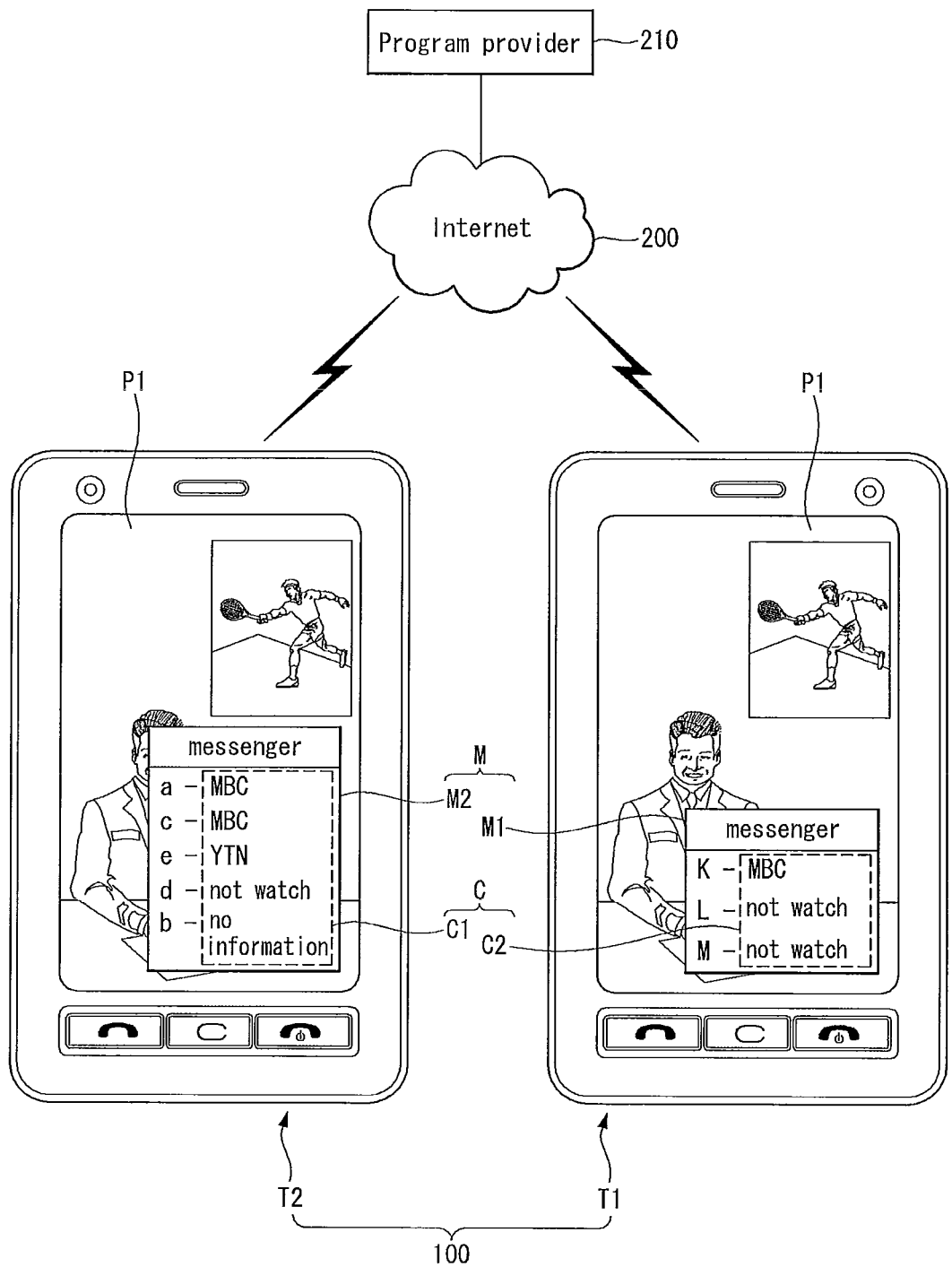
FIG. 5 is an overview illustrating an operation of the mobile terminal according to the information processing method illustrated in FIG. 4.

Next, FIG. 4 is a flow chart illustrating an information processing method in a mobile terminal according to a first embodiment of the present invention, and FIG. 5 is an overview illustrating an operation of the mobile terminal according to the information processing method illustrated in FIG. 4.

Further, in FIG. 5, a first mobile terminal T1 and a second mobile terminal T2 are distinguished from each other to explain that one side transmits data at the request of the other side through the Internet 200. When there is no need to distinguish the first and second mobile terminals T1 and T2 from each other, the reference number 100 denotes a 'mobile terminal'. In addition, a plurality of mobile terminals 100 can be connected through an instant messaging client M. Further, although the detailed embodiments of the present invention refer to the mobile terminal 100, the present invention can also be applied to a terminal fixed to a specific position.

In addition, the Internet 200 includes both a wired Internet and a wireless Internet and a user of the mobile terminal 100 connected to the Internet 200 can watch broadcasting programs provided by a program provider 210 through the Internet 200.

Further, IPTV (Internet Protocol TV) can be considered as a service of providing broadcasting programs through the Internet 200. In more detail, the IPTV is a type of digital convergence of the Internet and TV and is different from sky wave broadcast or cable broadcast because users can watch desired programs at a desired time.

In addition, the mobile terminal 100 can receive a broadcasting program provided by the program provider 210 through the DMB (Digital Multimedia Broadcasting) system corresponding to a digital broadcasting network such that the user of the mobile terminal 100 can watch the broadcasting program. That is, DMB is a broadcasting service that provides multimedia signals such as audio and video signals to the mobile terminal 100 in a digital manner.

In addition, as described in FIG. 4, the mobile terminal 100 according to the first embodiment of the present invention includes an operation S10 in which the second mobile terminal T2 acquires channel information C from the first mobile terminal T1. That is, when a user of the mobile terminal 100 watches a specific broadcasting program, information on the specific broadcasting program can be shared with other mobile terminals 100.

In more detail, when a user of the first mobile terminal T1 watches "MBC" corresponding to a broadcasting program P1, channel information C of the broadcasting program P1 is transmitted through the instant messaging client M, and thus a user of the second mobile terminal T2 can be aware that the user of the first mobile terminal T1 is watching "MBC". That is, the broadcasting program watched by the other party can be recognized through the instant messaging client M without using a telephone or chatting service so that mobile terminal users can use their mobile terminals more conveniently.

In addition, the channel information C includes the channel names (e.g., MBC, SBS, KBS, YTN and CNN), channel number (e.g., 11, 9 and 7), program title (e.g., financial news and sports news) and detailed information (e.g., program broadcasting time) of a broadcasting program, and information on whether a broadcasting signal is received (whether the other party is watching a broadcasting program).

The first mobile terminal T1 that initially receives the channel information C can also acquire the channel information C through an EPG (Electronic Program Guide) or an ESG (Electronic Service Guide). The second mobile terminal T2 can also receive the channel information C from the first mobile terminal T1 or receive some of information from the first mobile terminal T1 and then receive the additional channel information C through the EPG or ESG.

Further, the broadcasting program channel information C can be transmitted through the instant messaging client M connected to the Internet. As discussed above, the Internet includes the wired Internet and wireless Internet. Also, the instant messaging client M corresponds to a client program that requests specific data and a method for receiving the channel information C is not limited to the instant messaging client M in embodiments of the present invention.

In addition, the broadcasting programs can be received through IPTV using the Internet or DMB using a digital broadcasting network. However, the methods of using the Internet or digital broadcasting network are not limited to IPTV and DMB.

Further, as shown in FIG. 4, when the second mobile terminal T2 acquires the channel information C from the first mobile terminal T1, the first mobile terminal T2 arranges the acquired channel information C and displays the arranged channel information C in an operation S20. In addition, the instant messaging client M can display a plurality of opposite parties without restricting the number of opposite parties. Furthermore, the opposite parties may respectively watch different broadcasting programs. Accordingly, the instant messaging client M can arrange the channel information C based on a specific standard and display the arranged channel information C in order to improve convenience of using the mobile terminal 100.

In addition, as shown in FIG. 4, a broadcasting program corresponding to one of items selected from the arranged channel information C can be displayed in an operation S50. Thus, because the channel information C is arranged and displayed, a user can easily select a desired channel.

Further, the broadcasting program can be video contents including sounds and images or audio contents including only sounds. Images are displayed while sounds are reproduced when the broadcasting program corresponds to the video contents, and sounds are reproduced when the broadcasting program corresponds to the audio contents. A predetermined background image can also be displayed when the sounds of the audio contents are reproduced to attract a user's interest.

The respective operations illustrated in FIG. 4 will now be explained in detail with reference to the additional figures.

Figure 6:
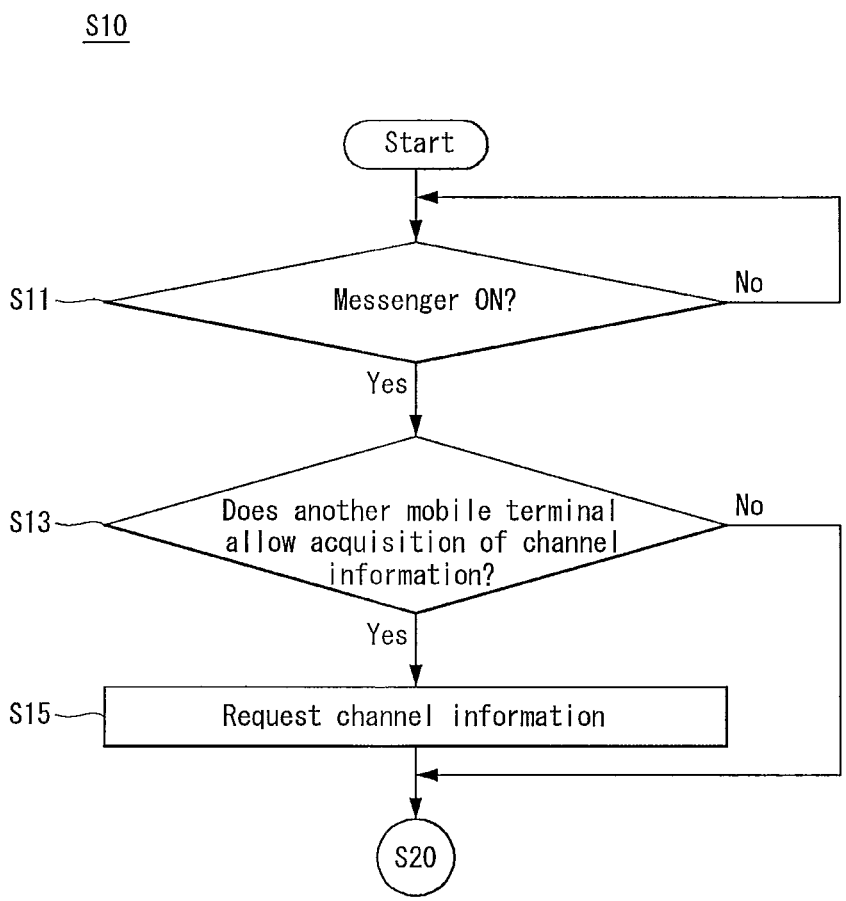
FIG. 6 is a flow chart illustrating an operation of acquiring channel information form another mobile terminal, illustrated in FIG. 4.
Figure 7:
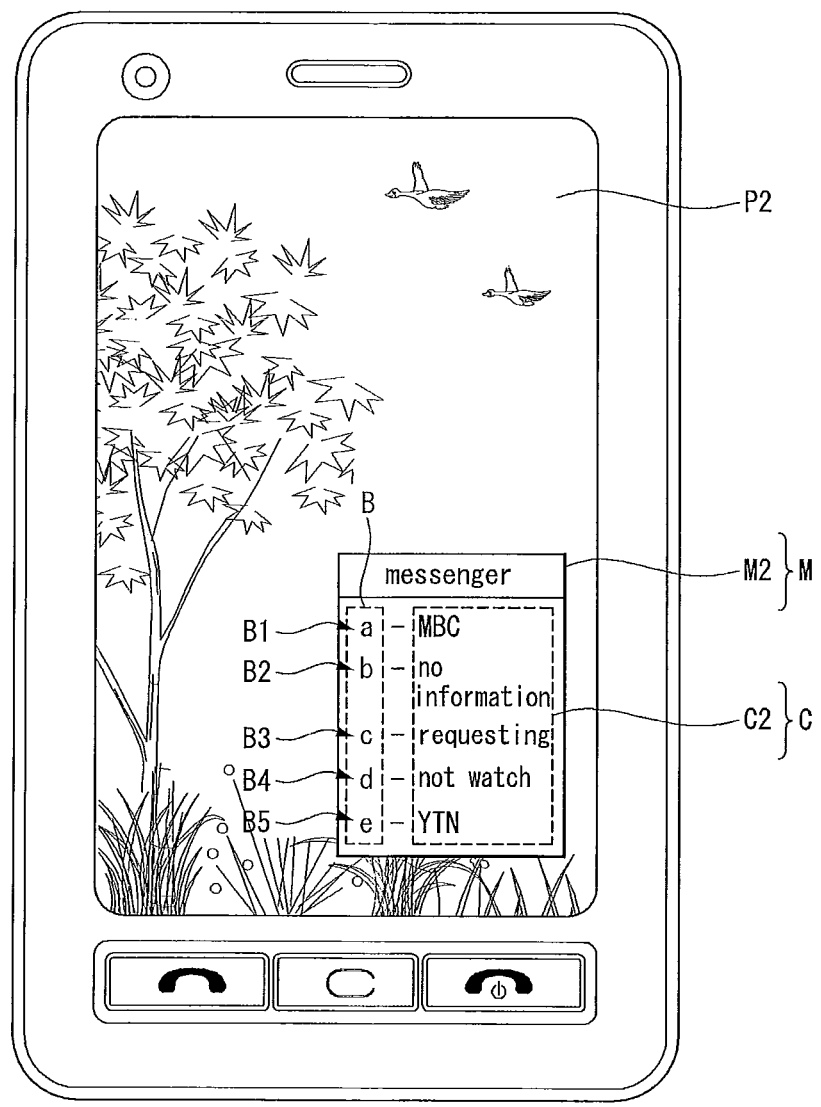
FIGS. 7-9 are overviews of display screens illustrating an operation of the mobile terminal according to the operation illustrated in FIG. 6.
Figure 8:
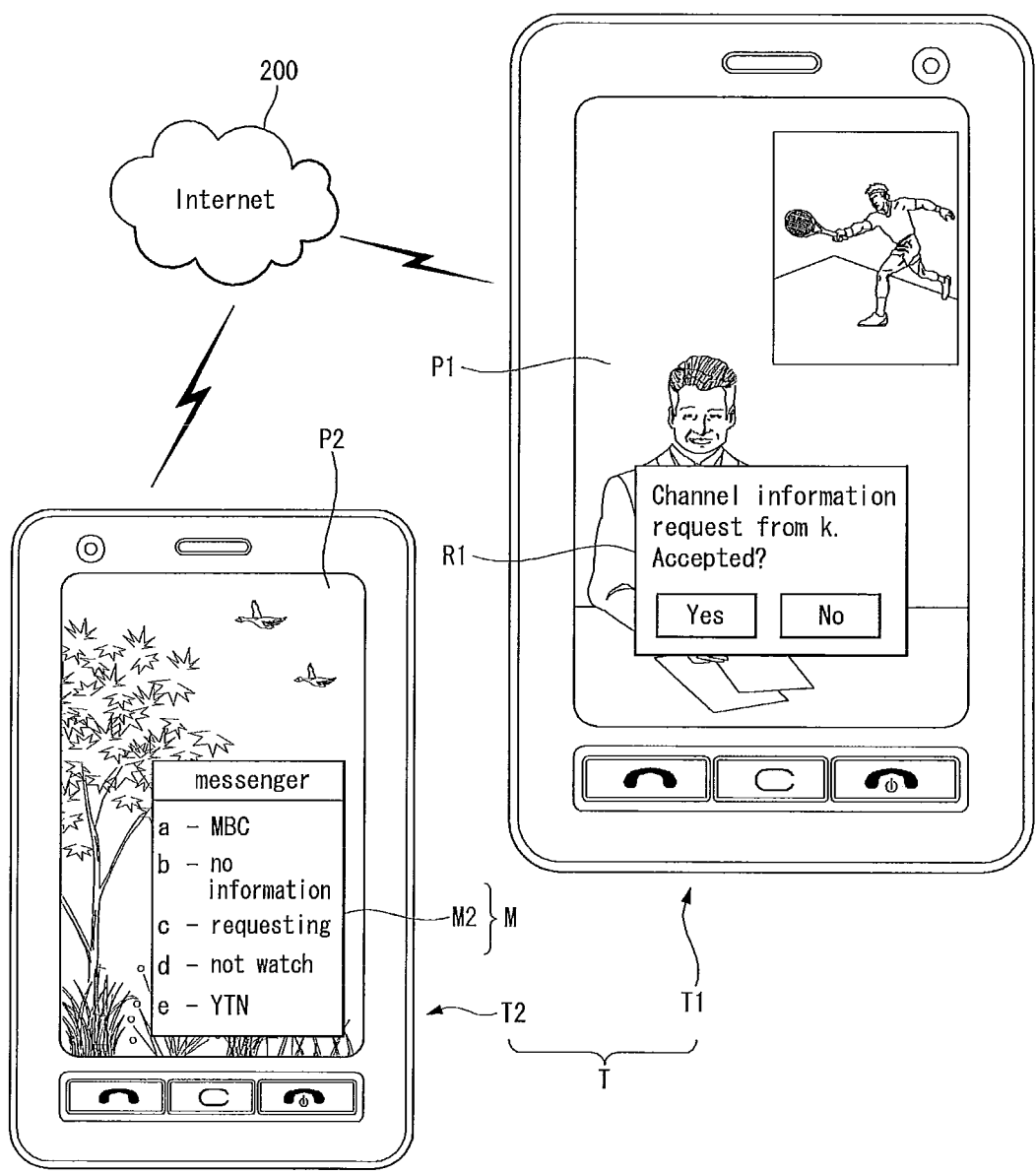
Figure 9:
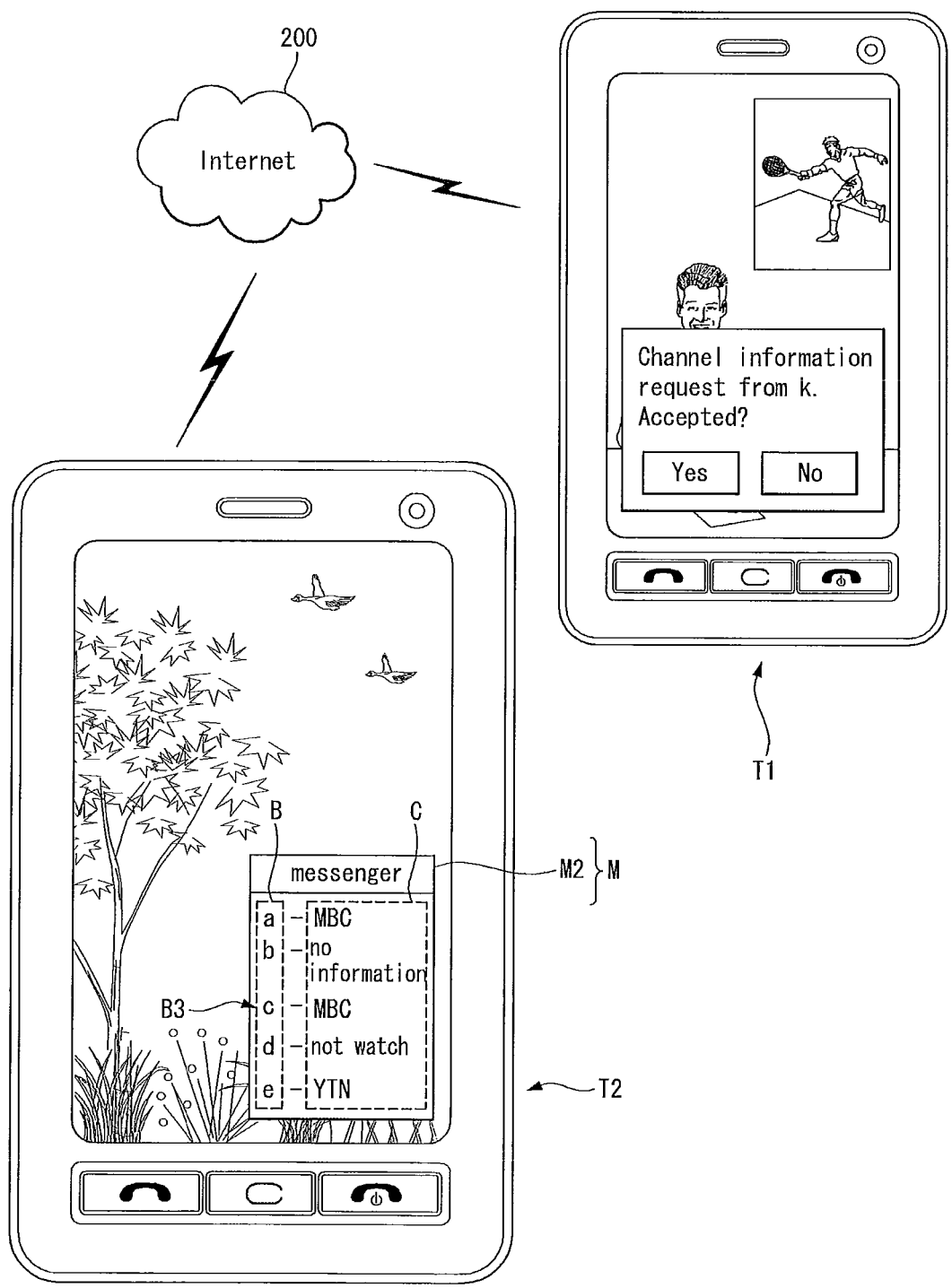

FIG. 6 is a flow chart illustrating the operation S10 in FIG. 4 of acquiring channel information of another mobile terminal, and FIGS. 7-9 are overviews of display screens illustrating an operation of the mobile terminal according to the operation illustrated in FIG. 6.

Referring to FIG. 6, the controller 180 determines whether the instant messaging client M connected to the Internet in order to acquire the channel information C is activated (step S11). As described above, the method for acquiring the channel information C is not limited to the instant messaging client M.

When the instant messaging client M is activated (Yes in step S11), the controller 180 determines whether the first mobile terminal T1 from which the channel information C will be acquired permits acquisition of the channel information C (step S13). That is, the user of the mobile terminal T1 may not want to transmit the channel information C on the broadcasting program that he/she is watching to an opposite party according to different circumstances. Thus, it is possible to prevent the instant messaging client M from transmitting the channel information C such that the another party cannot acquire the channel information C.

When the first mobile terminal T1 permits acquisition of the channel information C (Yes in step S13), the channel information C can be requested (step S15). In addition, all parties B registered in the instant messaging client M can be automatically requested to provide channel information C or only a selected specific party can be requested to provide channel information C. When all of the parties B registered in the instant messaging client M are automatically requested to provide the channel information C, the step of confirming whether each of the opposite parties B permits the channel information C to be provided and requesting an opposite party that permits to provide the channel information C can be repeated for the respective opposite parties B.

Referring to FIG. 7, the second mobile terminal T2 may display a predetermined background image P2. When the instant messaging client M is operated in this state, the instant messaging client M can request registered opposite parties B to provide channel information C and acquire the channel information C.

If the opposite parties B include first through five counter parties B1 through B5, the user of the terminal T2 can see the first opposite party B1 and the fifth opposite party B5 are watching "MBC" and "YTN," respectively. In addition, the second opposite party B2 refuses to provide channel information C so that the channel information C cannot be acquired from the second opposite party B2. Accordingly, "No information" is displayed for the second opposite party B2.

The third opposite party B3 is represented as "requesting" because channel information C is currently being acquired from the third opposite party B3. The third opposite party B3 corresponds to the user "c" of the first mobile terminal T1 illustrated in FIGS. 8 and 9, which will be explained later. The fourth opposite party B4 is represented as "not watch" because he/she is not watching any broadcasting program.

Next, FIG. 8 illustrates that the user "c" of the first mobile terminal T1 corresponding to the third opposite party B3 is requested to provide the channel information C. A second instant messaging client M2 of the second mobile terminal T2 requests the first mobile terminal T1 to provide the channel information C through the Internet 200.

In addition, as shown in FIG. 8, a first pop-up window R1 asking the user "c" of the first mobile terminal T1 will allow the user "k" of the second mobile terminal T2 to acquire the channel information C on the first mobile terminal T1 requested to provide the channel information C.

Referring to FIG. 9, the second instant messaging client M2 of the second mobile terminal T2 displays "MBC" corresponding to the broadcasting program P1 watched by the user of the first mobile terminal T1 when the user of the first mobile terminal Ti allows the user "k" of the second mobile terminal T2 to receive the channel information C.

Figure 10:
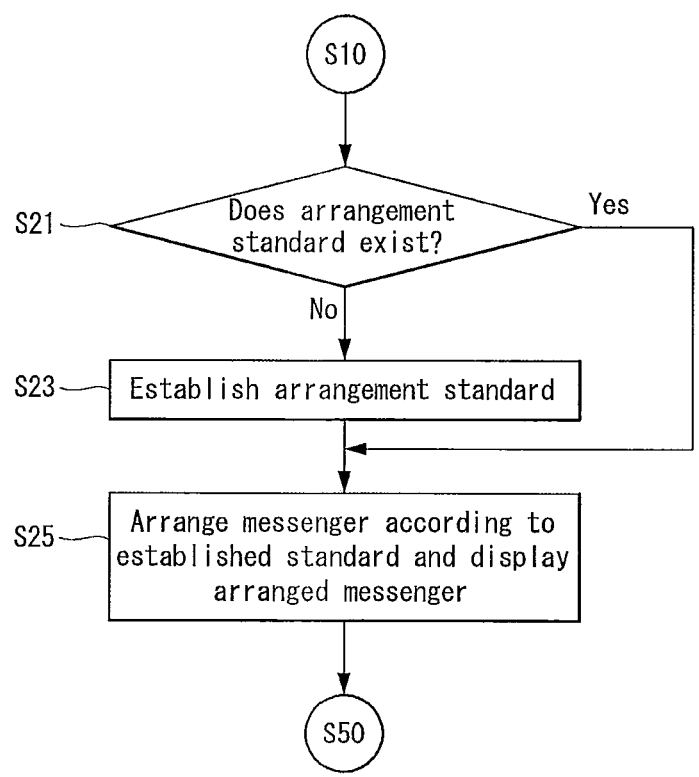
FIG. 10 is a flow chart illustrating an operation of arranging the channel information illustrated in FIG. 4.

Next, FIG. 10 is a flow chart illustrating the operation S20 in FIG. 4 of arranging the channel information, and FIGS. 11-15 are overviews of display screens illustrating an operation of the mobile terminal according to the operation illustrated in FIG. 10.

Referring to FIG. 10, the controller 180 determines whether a standard for arrangement of the channel information C exists (step S21). When the standard for arrangement of the channel information C does not exist (No in step S21), the standard is established (step S23). The standard can be automatically established by the controller 180 or a specific standard can be selected by a user. When the standard exists (Yes in step S21) or is established, the channel information C of the instant messaging client M is arranged and displayed (step S25).

Figure 11:
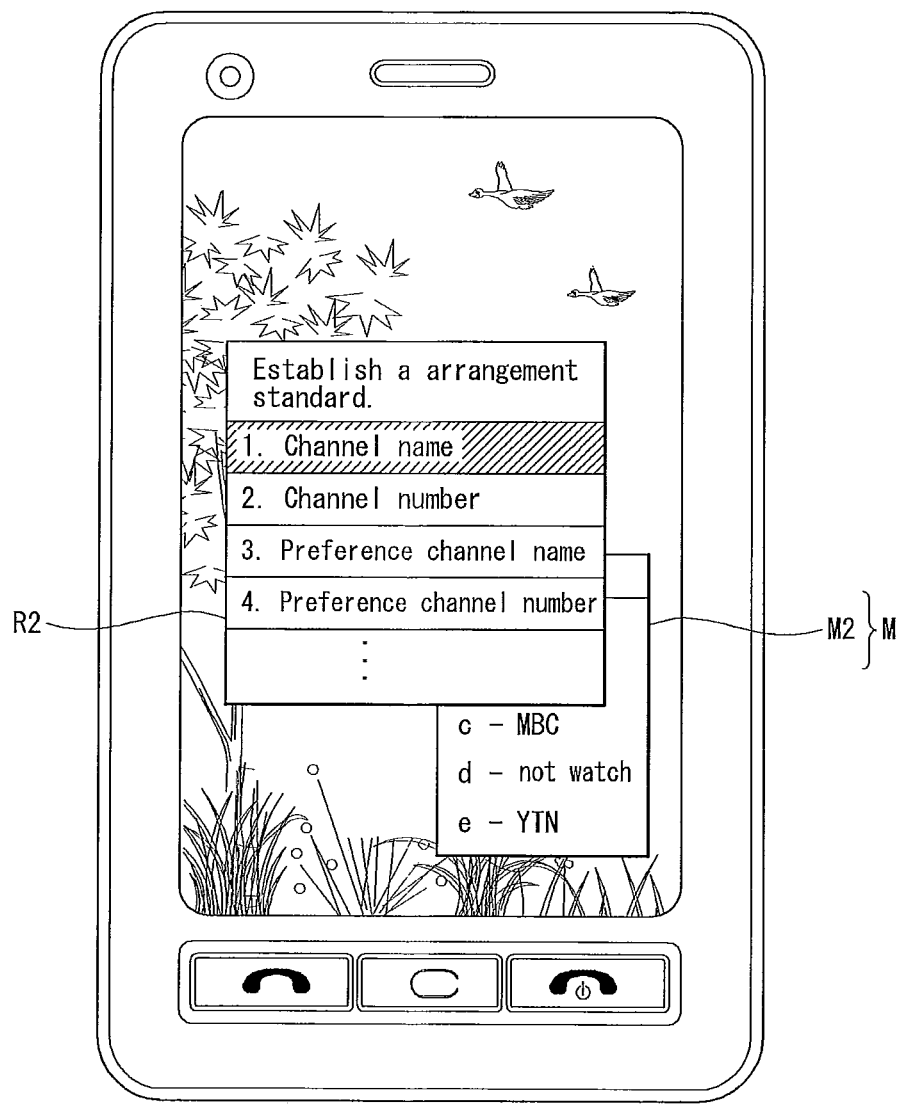
FIGS. 11-15 are overviews of display screens illustrating an operation of the mobile terminal according to the operation illustrated in FIG. 10.
Figure 12:
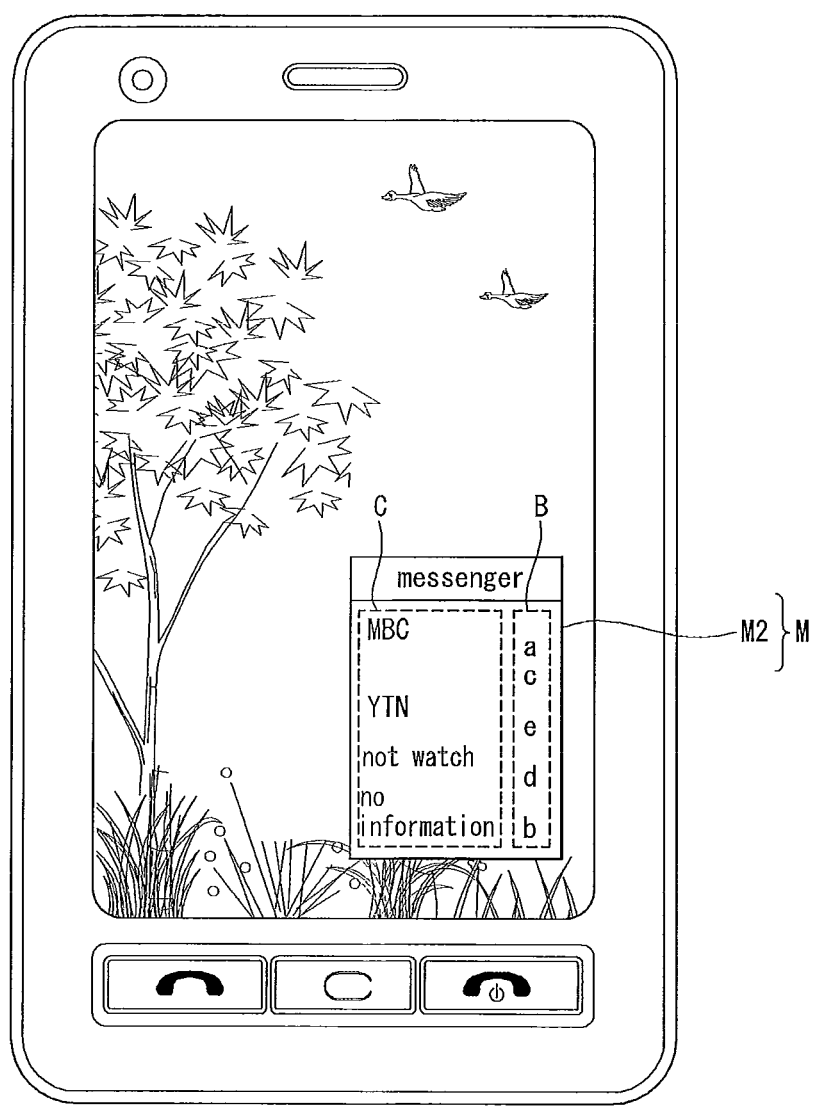

FIGS. 11 and 12 are overviews of display screens illustrating an operation of establishing the standard for arrangement of channel information by a user when the standard does not exist. Referring to FIG. 11, when the step of acquiring the channel information C for the opposite parties B registered in the instant messaging client M is finished, the controller 180 can display a second pop-up window R2 for inquiring which standard will be used to arrange the channel information C.

As shown, the second pop-up window R2 can display various applicable arrangement standards including a channel name, a channel number, a preference channel name, a preference channel number and so on. The user can then select a desired one of the standards arranged in the second pop-up window R2.

FIG. 12 illustrates that the user has selected the "channel name" as the arrangement standard. Referring to FIG. 12, the channel names are arranged in a predetermined order when the user selects "channel name." In addition, when the channel information C is arranged based on channel names, opposite parties B that receive broadcasting programs with the same channel name can be easily confirmed.

Figure 13:
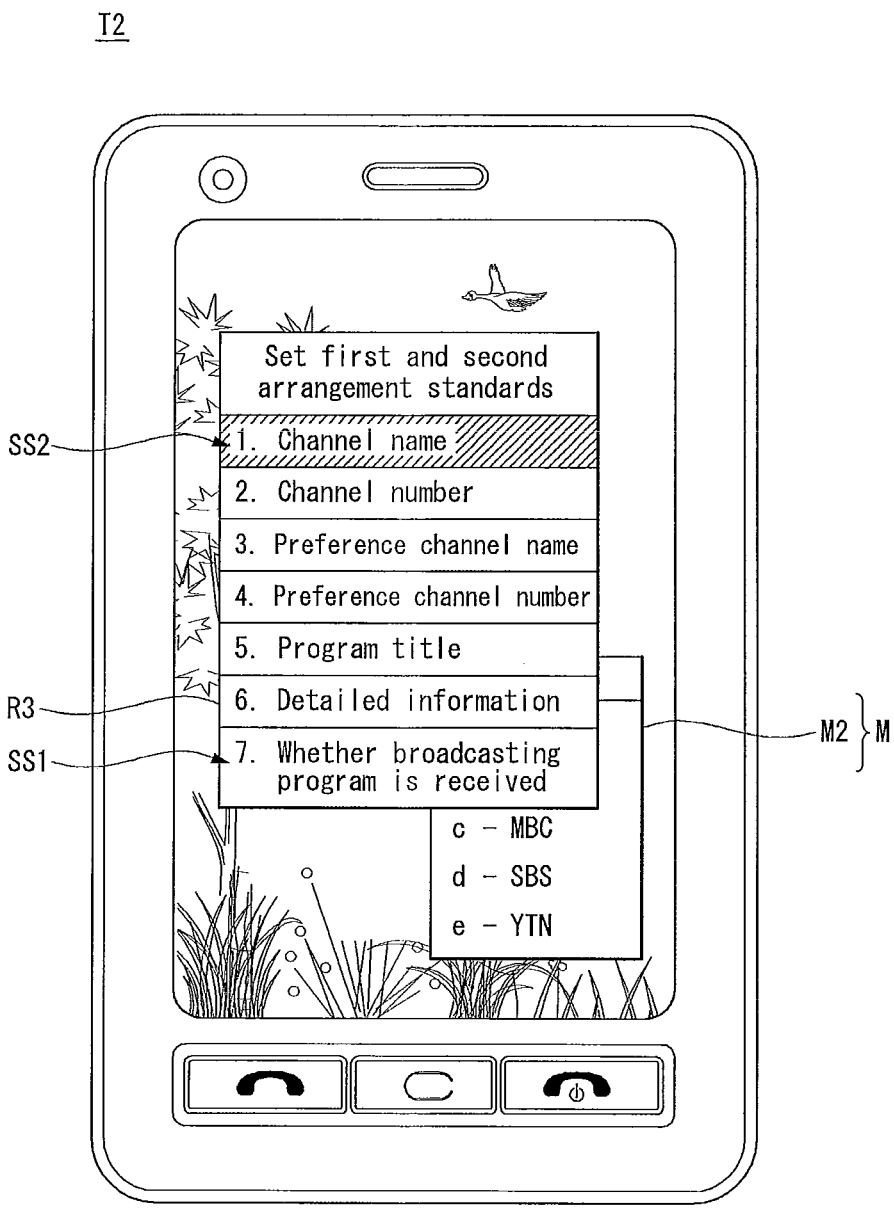
Figure 14:
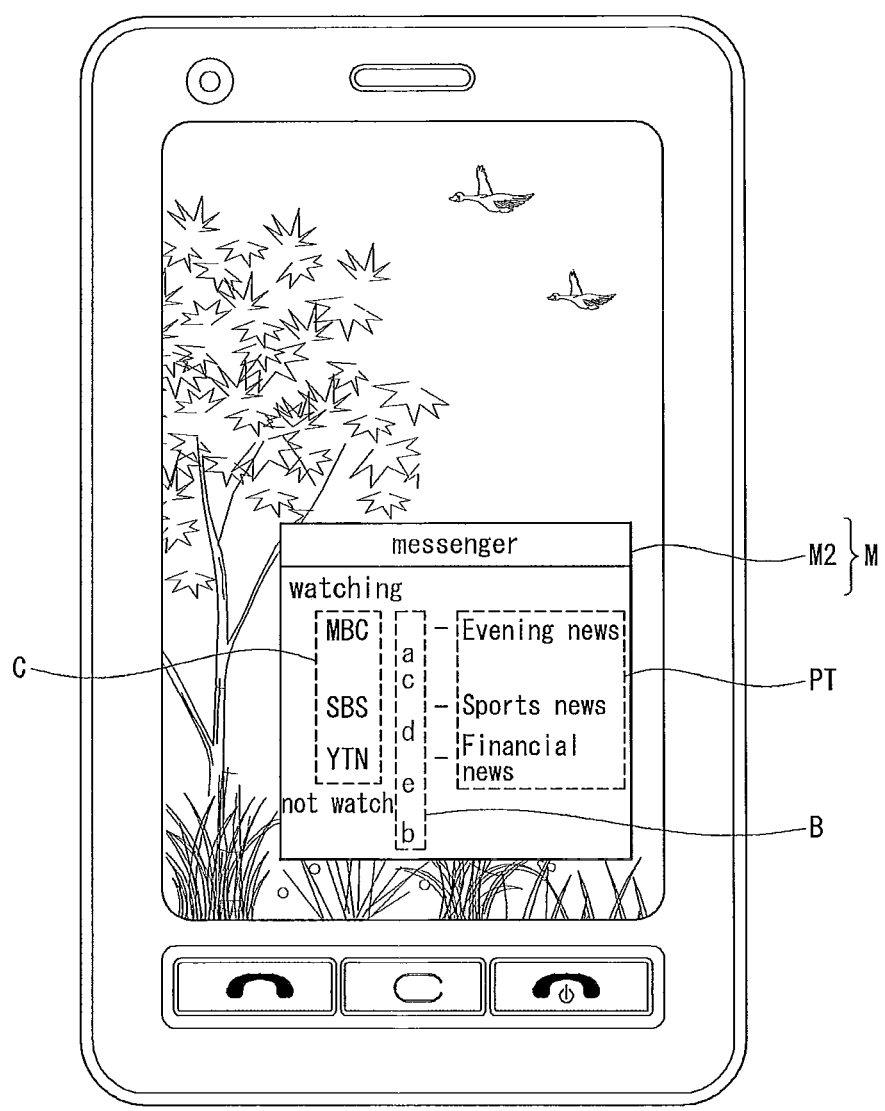

In addition, FIGS. 13 and 14 illustrate that the channel information C is arranged based on multiple standards. Referring to FIG. 13, a third pop-up window R3 for requesting first and second arrangement standards SS1 and SS2 can be displayed. In this instance, the user can select "whether broadcasting signals are received" as the first arrangement standard SS1 and select "channel name" as the second arrangement standard SS2.

Referring to FIG. 14, the instant messaging client M classifies the channel information C into "watching" and "not watch" based on the first arrangement standard SS1, and then arranges the classified channel information C based on the second arrangement standard SS2 corresponding to "channel name". Further, the title PT of a currently broadcasting program can be added to "channel name." The user of the second mobile terminal T2 can then select a broadcasting program with reference to the program title PT.

Figure 15:
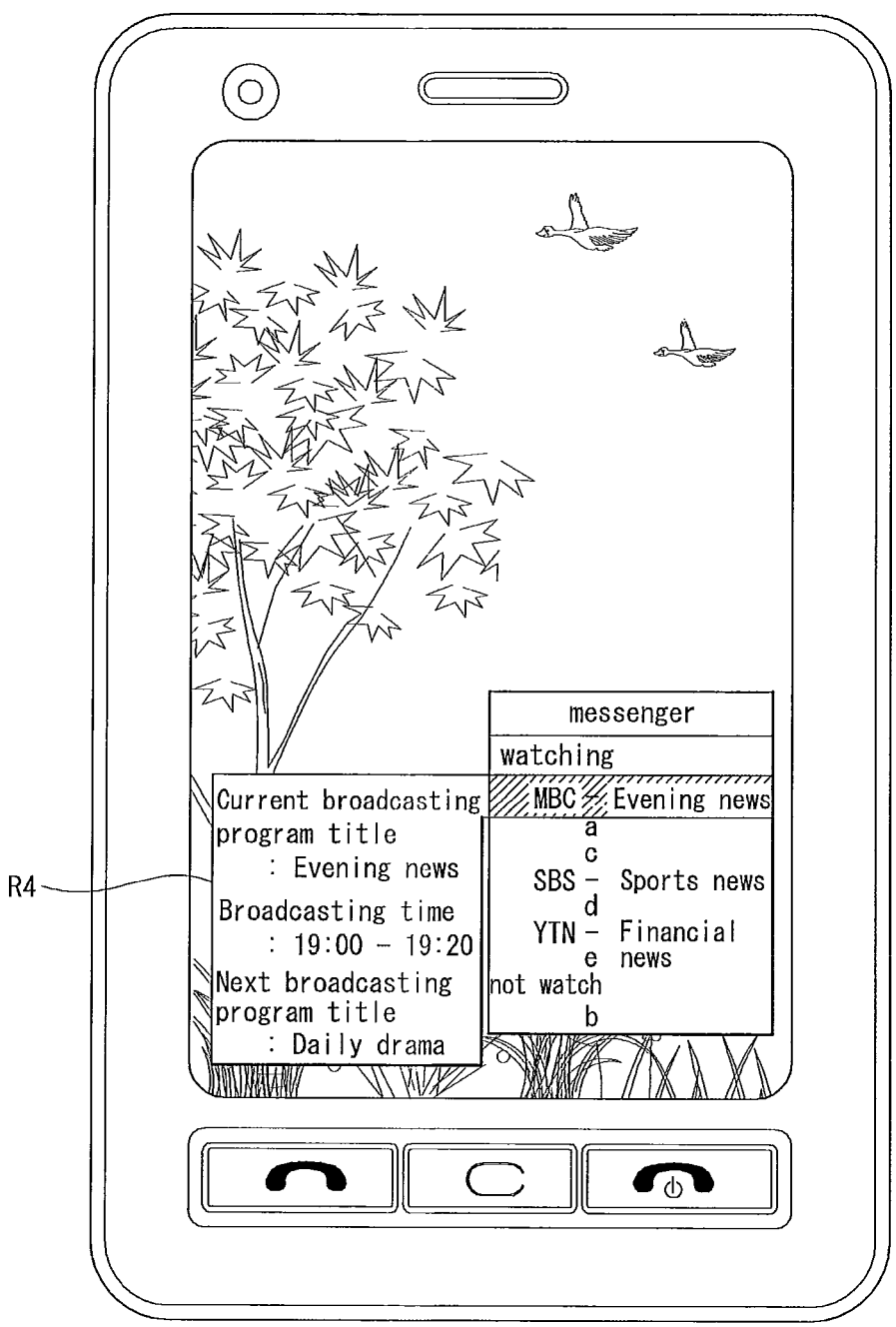

In addition, FIG. 15 illustrates that detailed information on a selected "channel name" is displayed through a fourth pop-up window R4 when the "channel name" is selected in the arrangement state illustrated in FIG. 14. That is, when the user wants to see detailed information on "MBC," the fourth pop-up window R4 can display a broadcasting time and the title of a broadcasting program that will be broadcasted after the current broadcasting program.

Figure 16:
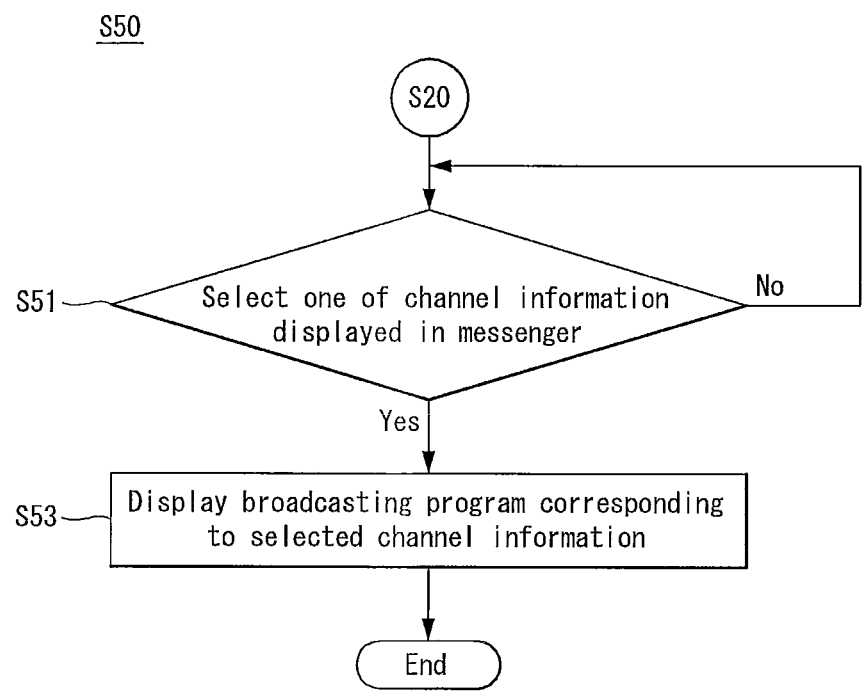
FIG. 16 is a flow chart illustrating an operation of displaying a broadcasting program illustrated in FIG. 4.
Figure 17:
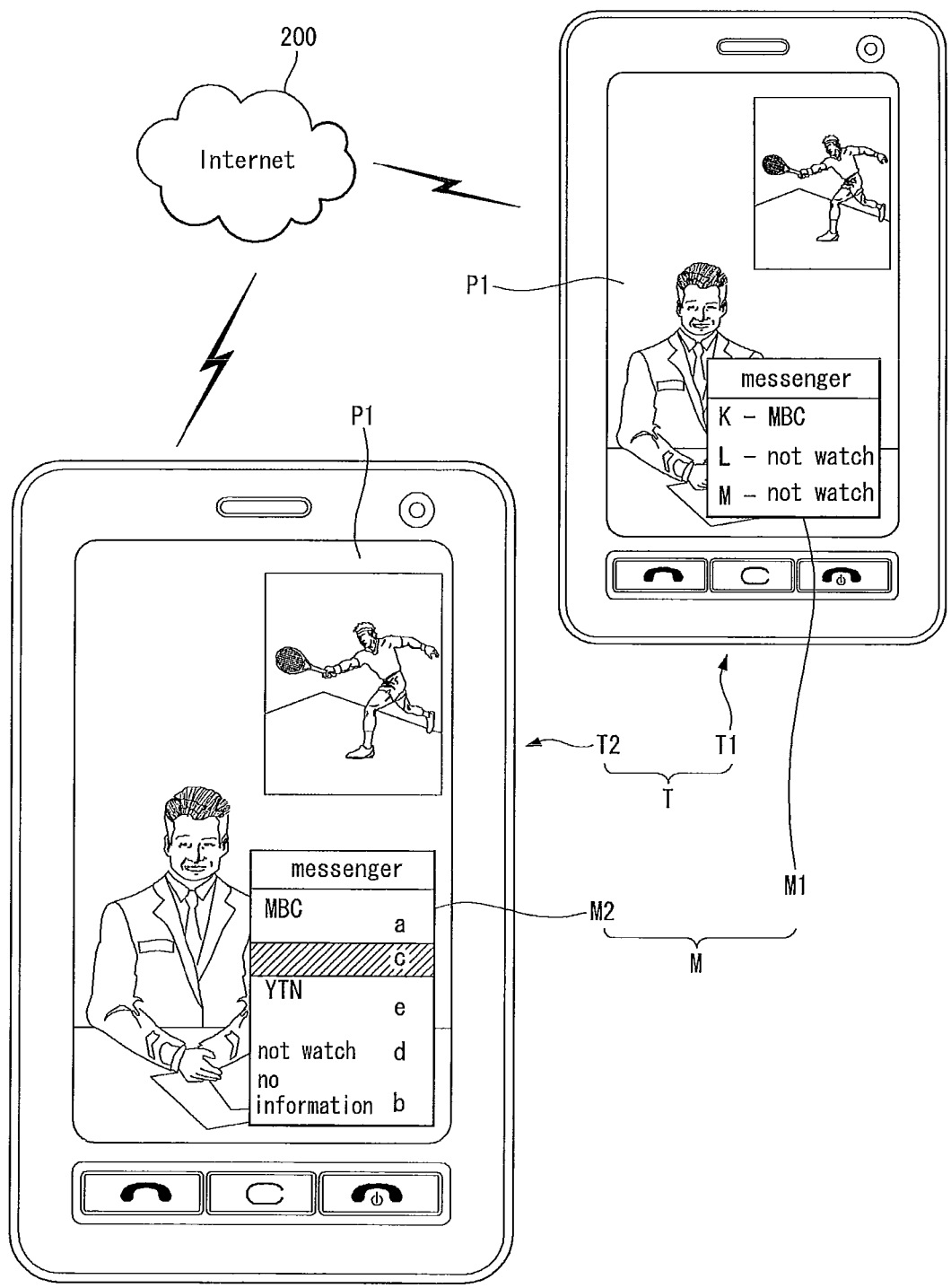
FIG. 17 is an overview illustrating an operation of the mobile terminal according to the operation illustrated in FIG. 16.

Next, FIG. 16 is a flow chart illustrating the operation S50 in FIG. 4 of displaying the broadcasting program, and FIG. 17 is an overview illustrating an operation of the mobile terminal according to the operation illustrated in FIG. 16.

Referring to FIG. 16, the controller 180 determines whether one of items of the channel information C displayed in the instant messaging client M is selected (step S51). When the channel information C received from the first mobile terminal T1 is arranged, the user can easily select desired channel information C as compared to when the channel information C is not arranged.

Then, when one of the items of the displayed channel information C is selected (Yes in step S51), the controller 180 outputs a broadcasting program corresponding to the selected channel information C (step S53). As described above, the broadcasting program can be video contents or audio contents. Accordingly, to output the broadcasting program corresponds to reproducing sounds and displaying images when the broadcasting program corresponds to the video contents, and corresponds to reproducing sounds when the broadcasting program corresponds to the audio contents. Also, as discussed above, for the audio contents, a predetermined image can be displayed while the sounds are reproduced to attract a user's interest.

In addition, FIG. 17 illustrates that the broadcasting program selected from the received channel information is displayed. Further, the first and second mobile terminals T1 and T2 are connected through the instant messaging client M connected to the Internet 200. Thus, the user of the second mobile terminal T2 can select "c" displayed on the second instant messaging client M2 to watch the broadcasting program P1 that is being watched by the user of the first mobile terminal T1. Further, the second mobile terminal T2 can receive the broadcasting program P1 through the Internet 200 or a digital broadcasting network.

Figure 18:
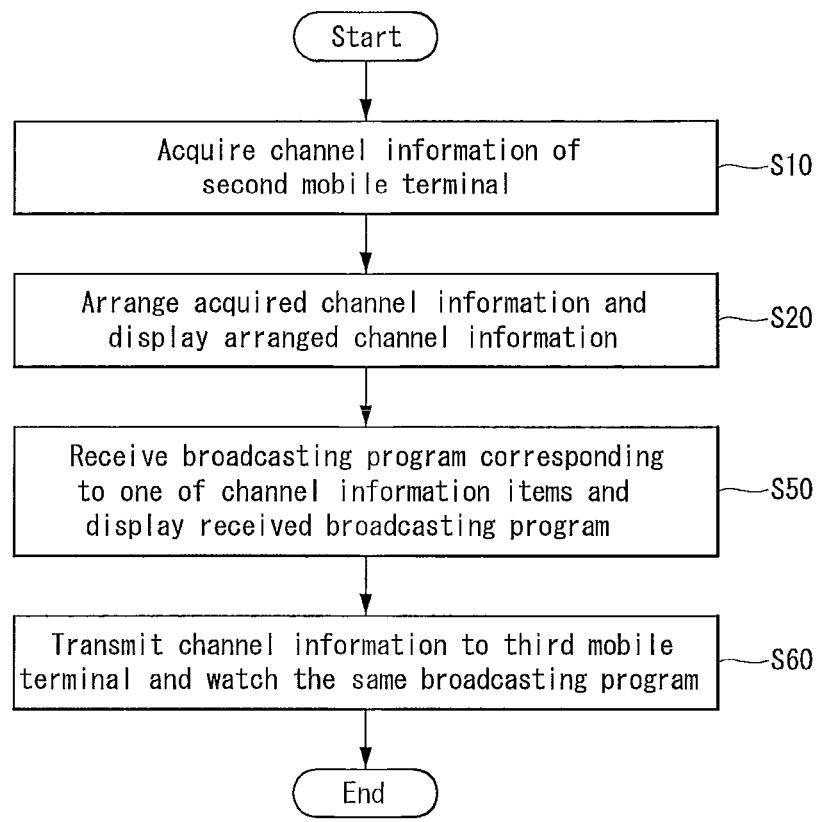
FIG. 18 is a flow chart illustrating an information processing method of a mobile terminal according to a second embodiment of the present invention.

Next, FIG. 18 is a flow chart illustrating an information processing method of a mobile terminal according to a second embodiment of the present invention. Referring to FIG. 18, the information processing method includes an operation S60 of transmitting channel information to a third mobile terminal and watching the same broadcasting program. As described in the first embodiment of the present invention, the second mobile terminal T2 can receive the channel information C from the first mobile terminal T1 and receive a broadcasting program based on the received channel information C. These are illustrated by the steps S10, S20 and S50 in FIGS. 4 and 18.

Furthermore, in FIG. 18, the second mobile terminal T2 can transmit the channel information C to a third mobile terminal T3 such that a user of the third mobile terminal can watch the broadcasting program corresponding to the channel information C (S60).

Figure 19:
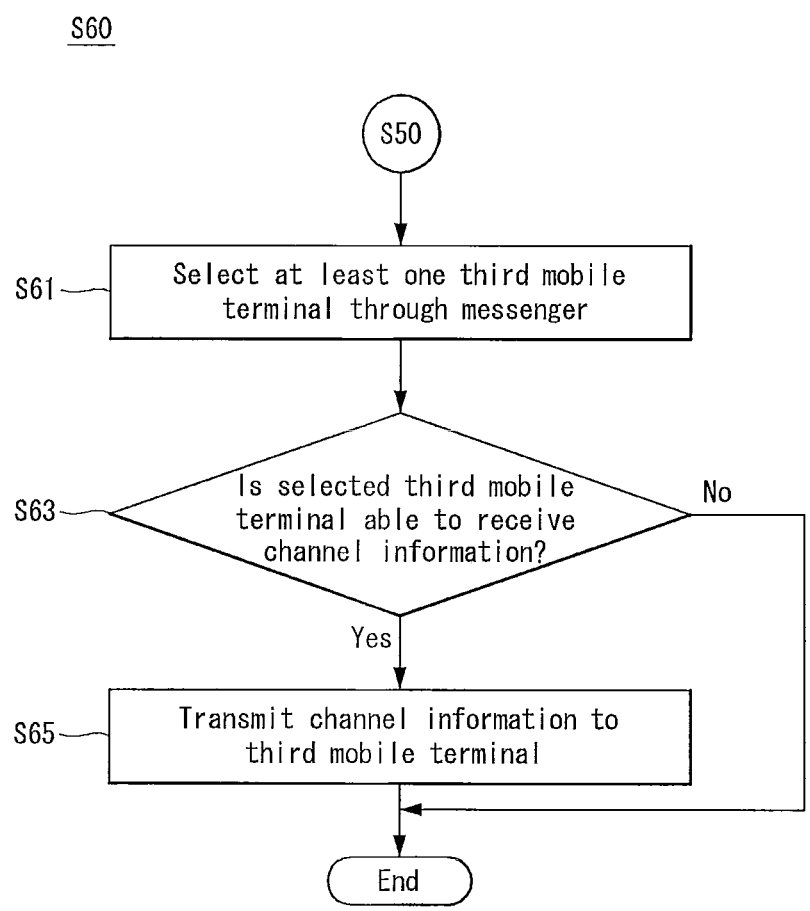
FIG. 19 is a flow chart illustrating an operation of watching the same broadcasting program illustrated in FIG. 18.

In more detail, FIG. 19 is a flow chart illustrating the operation S60 in FIG. 18 of watching the same broadcasting program, and FIGS. 20-23 are overviews of display screens illustrating an operation of the mobile terminal according to the operation illustrate in FIG. 19.

Referring to FIG. 19, the operation S60 of watching the same broadcasting program is started with the selection of the third mobile terminal T3 through the second instant messaging client M2 (step S61). When the third mobile terminal T3 to which the channel information C will be transmitted is selected, the controller 180 determines whether the selected third mobile terminal T3 is able to receive the channel information C (step S63).

Further, the third mobile terminal T3 may not be able to receive the channel information C because its user does not allow the channel information C to be received. Accordingly, the controller 180 confirms whether the third mobile terminal T3 is able to receive the channel information C, and then the following step is performed when the third mobile terminal T3 can receive the channel information C. When the selected third mobile terminal T3 can receive the channel information C (Yes in step S63), the channel information C is transmitted to the third mobile terminal T3 (step S65).

Figure 20:
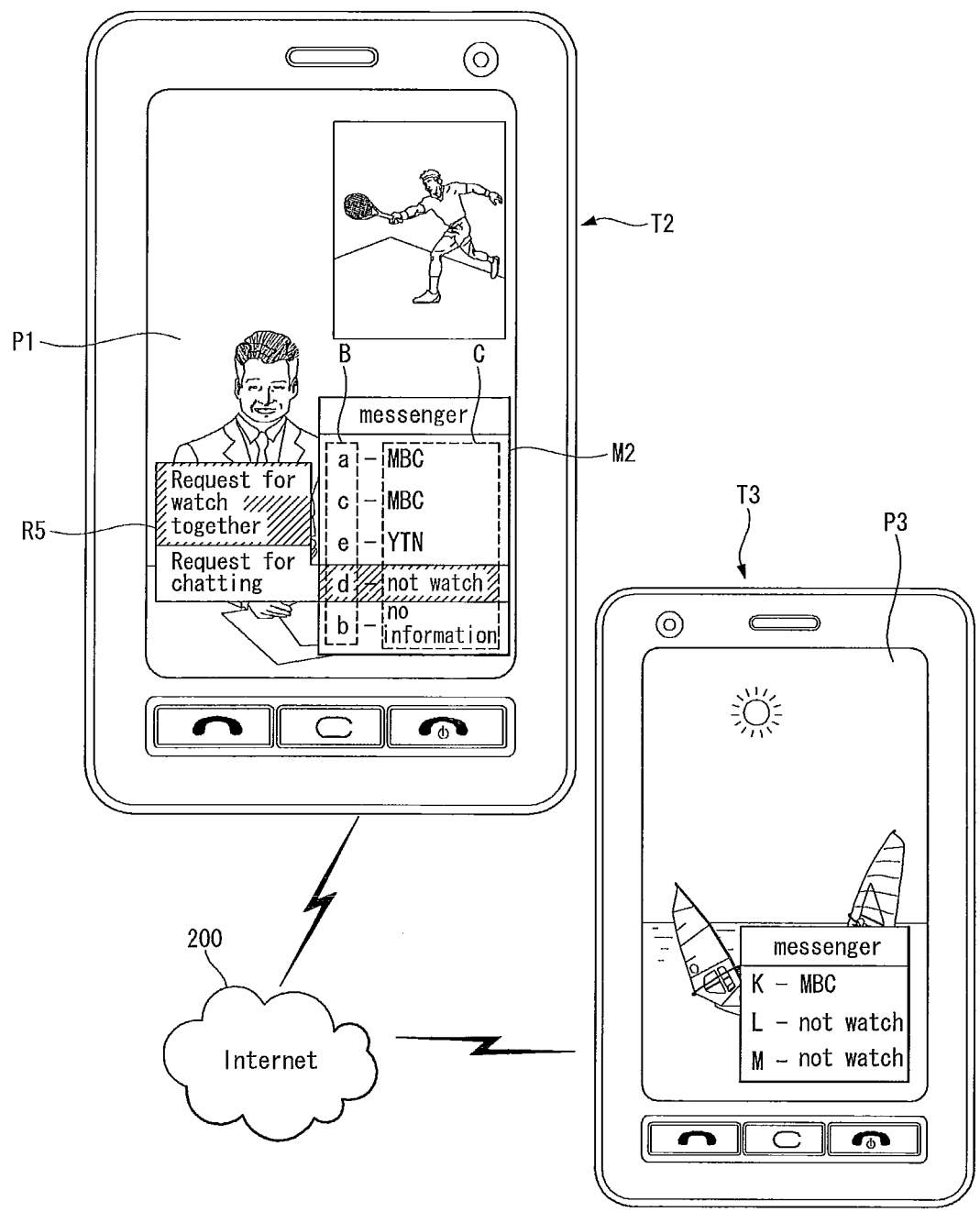
FIGS. 20-22 are overviews of display screens illustrating an operation of the mobile terminal according to the operation illustrate in FIG. 19.

Referring to FIG. 20, the second mobile terminal T2 can display a fifth pop-up window R5 for transmitting broadcasting information C on the currently received broadcasting program P1 to an opposite party "d" among the opposite parties B arranged in the second instant messaging client M2. As shown, the fifth pop-up window R5 can display a menu for transmitting the channel information C, and what can be called a "watch together" menu.

Figure 21:
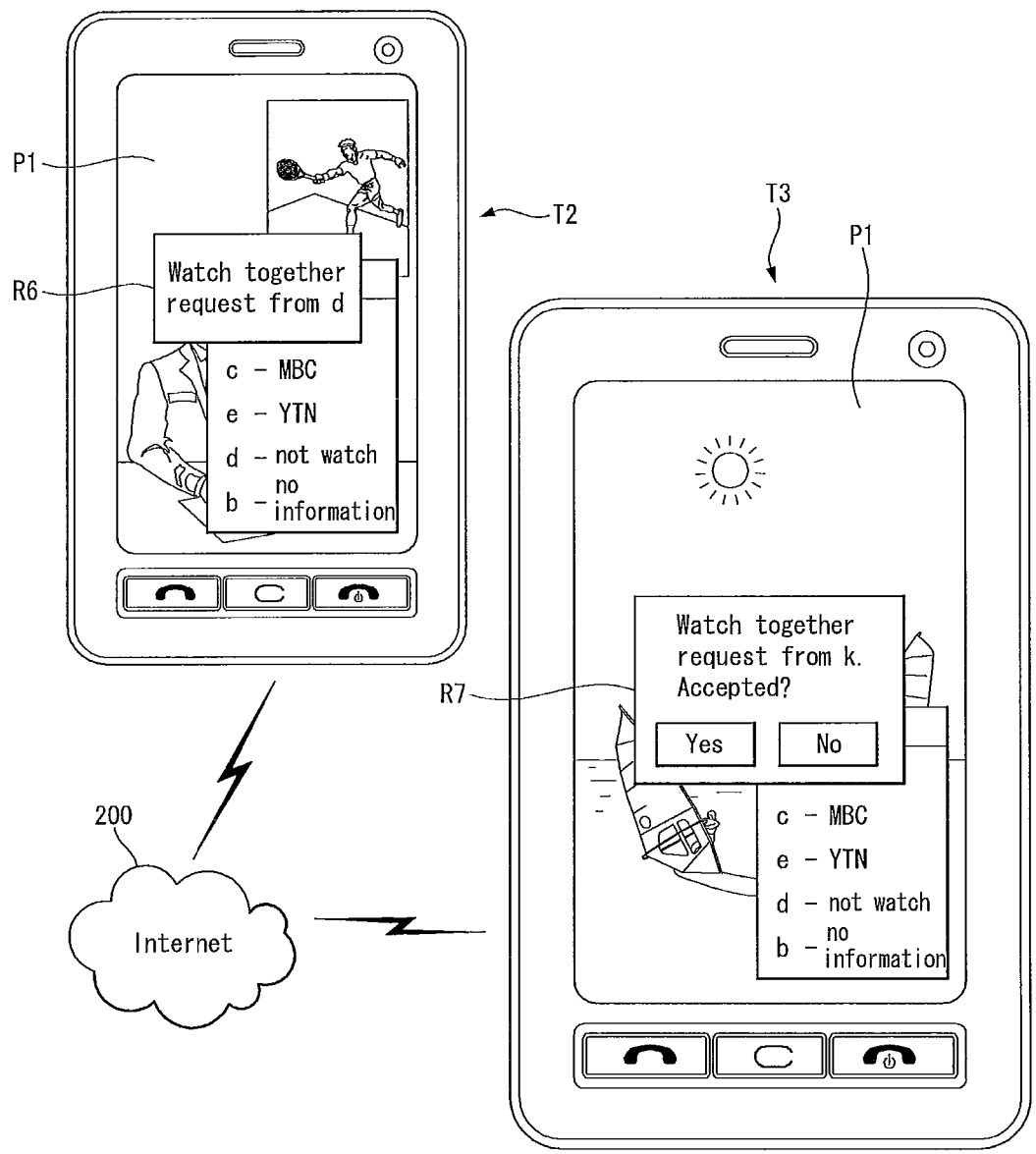

Referring to FIG. 21, when the "watch together" menu is selected, a sixth pop-up window R6 representing the "watch together" feature is requested is displayed on the second mobile terminal T2 and a seventh pop-up window R7 for inquiring whether the requested "watch together" feature is accepted is displayed on the third mobile terminal T3.

Figure 22:
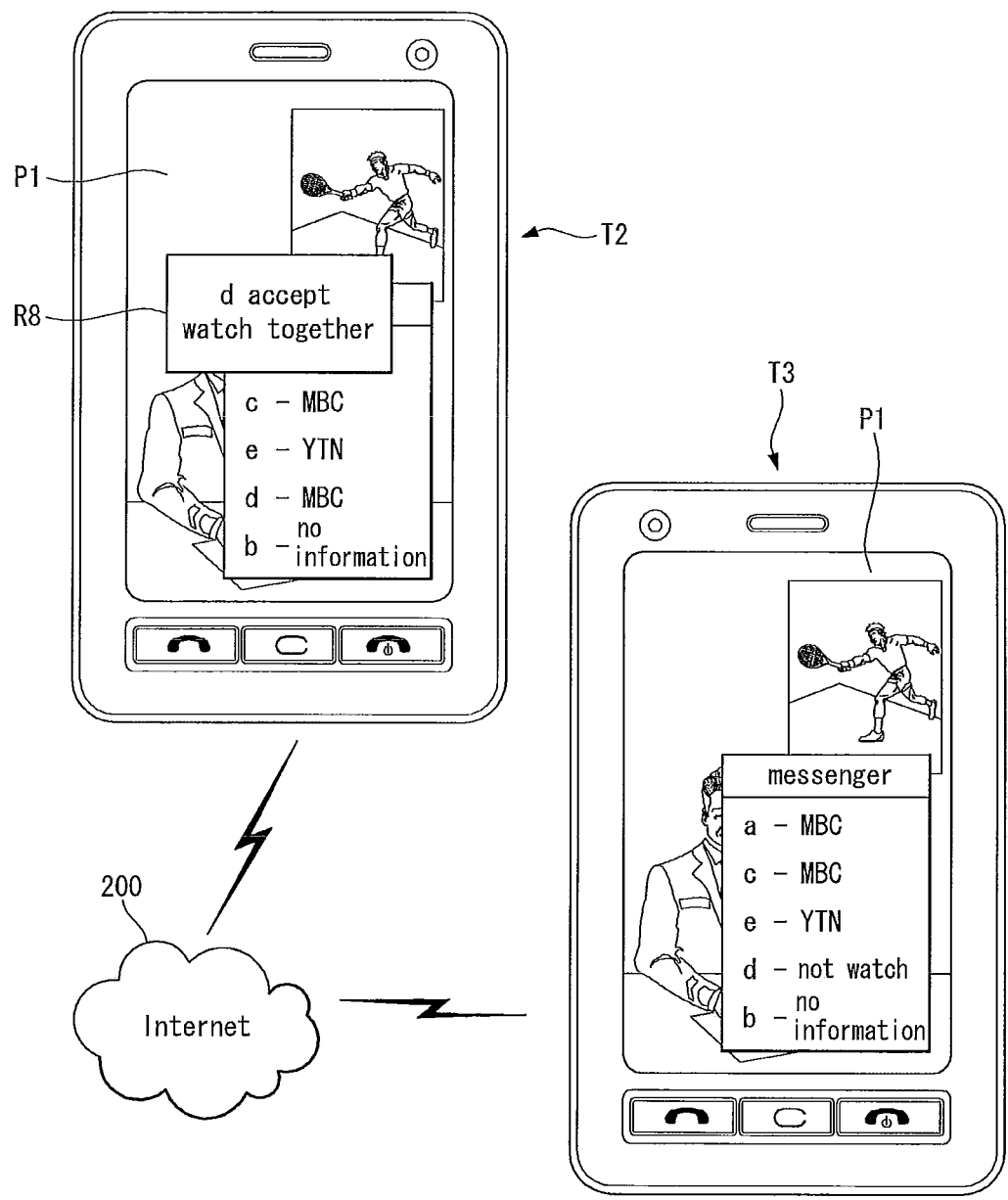

FIG. 22 illustrates that the third mobile terminal T3 accepts the "watch together" feature. As illustrated in FIG. 22, when the third mobile terminal T3 accepts the "watch together" feature, an eighth pop-up window R8 representing that the third mobile terminal T3 accepts the "watch together" feature can be displayed on the second mobile terminal T2.

Further, the third mobile terminal T3 can receive the channel information C from the second mobile terminal T2 and display the same broadcasting program P1 as that currently displayed on the second mobile terminal T2. Accordingly, the users of the second and third mobile terminals can watch the broadcasting program P1 together without having an additional step of exchanging a channel name through chatting.

Figure 23:
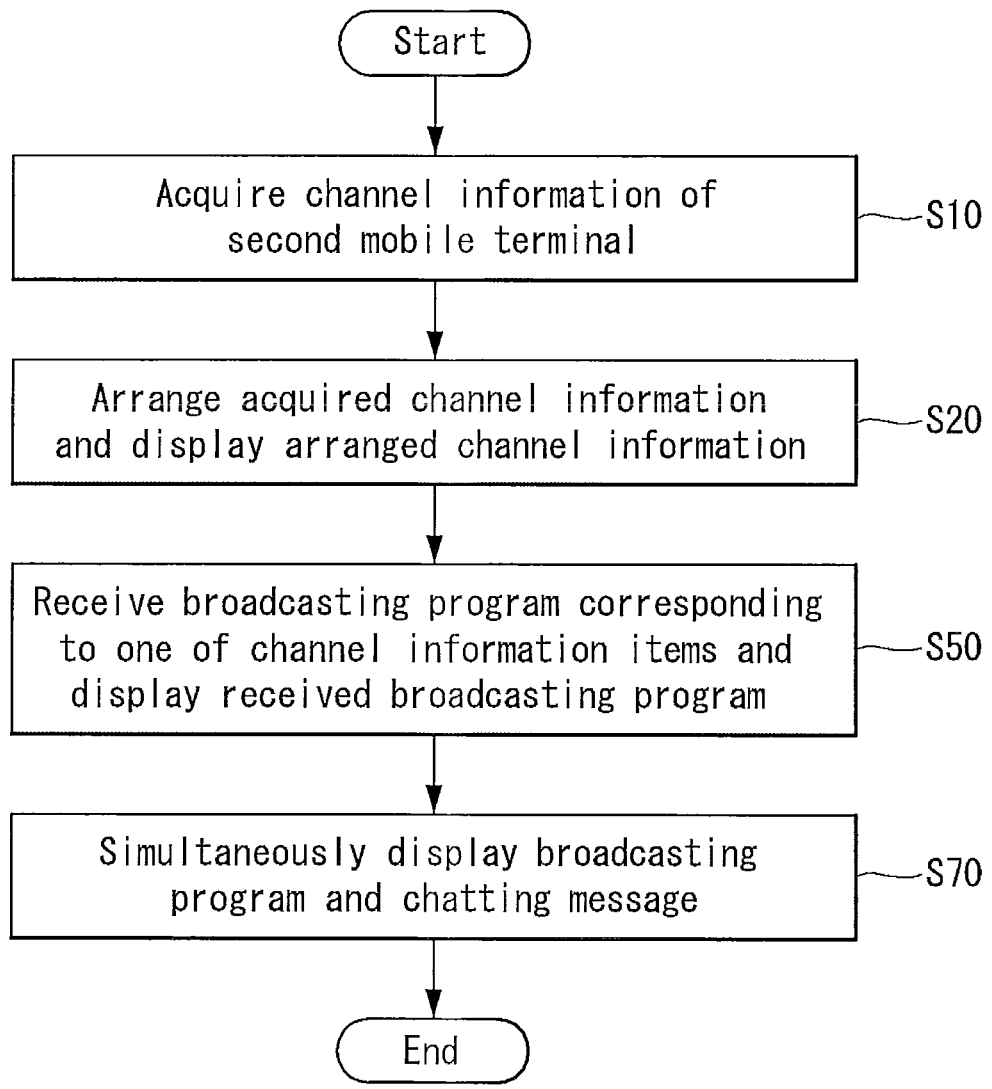
FIG. 23 is a flow chart illustrating an information processing method of a mobile terminal according to a third embodiment of the present invention.

Next, FIG. 23 is a flow chart illustrating an information processing method of a mobile terminal according to a third embodiment of the present invention. FIG. 23 also includes the same steps S10, S20 and S50 in FIGS. 4 and 18, and includes and additional operation S70 of simultaneously displaying a broadcasting program and a chatting message service. That is, a user can chat about a broadcasting program while watching the broadcasting program, and thus the user can use his/her mobile terminal more conveniently.

Figure 24:
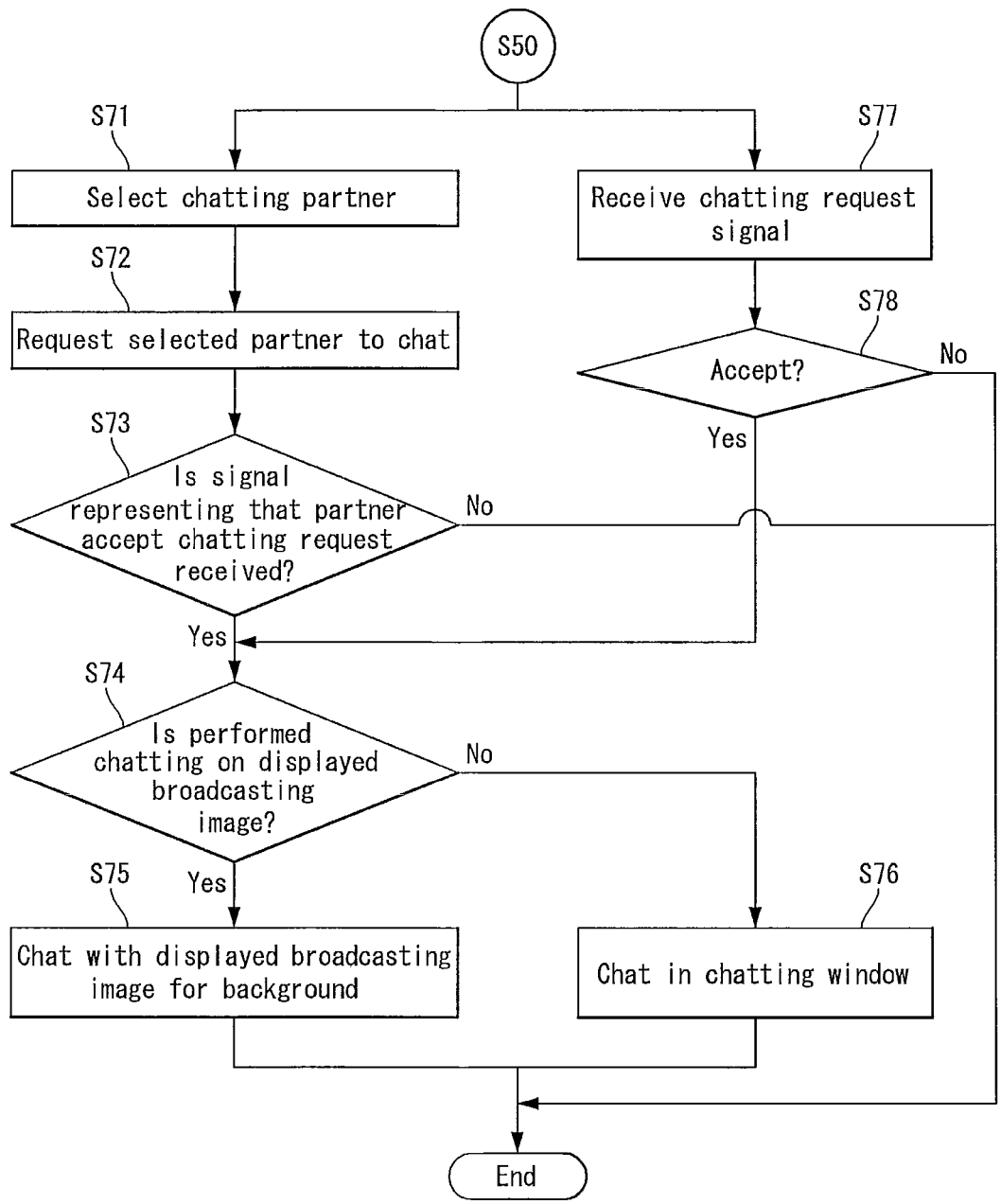
FIG. 24 is a flow chart illustrating an operation of simultaneously displaying a broadcasting program and a chatting message illustrated in FIG. 23.

In more detail, FIG. 24 is a flow chart illustrating the operation S70 of simultaneously displaying a broadcasting program and a chatting message illustrated in FIG. 23. Referring to FIG. 24, the user can first select a chatting partner to start chatting with (step S71). When the chatting partner is selected, the selected chatting partner is requested to chat (step S72). However, because the chatting partner may not want to chat, the method first determines whether or not the chatting partner wants to chat (step S73).

When the controller 180 receives a signal representing that the chatting partner wants to chat (Yes in step S73), the method determines whether chatting is to be performed with the broadcasting program displayed in a background (step S74). When the chatting is to be performed with the displayed broadcasting program image in the background (Yes in step S74), the controller 180 displays a dialog box for chatting in an overlapping manner with the broadcasting program displayed on the mobile terminal. Further, the dialog box can be displayed in a transparent or semi-transparent manner such that the user can simultaneously recognize the broadcasting program and a chatting message.

When the chatting is not to be performed with the displayed broadcasting program image in the background (No in step S74), the controller 180 displays an additional dialog box and the chatting session is performed in the additional dialog box (step S76). Also, as shown in FIG. 24, the chatting session can also be started when a chatting request signal is received from a party (step S77) and the chatting request is accepted (Yes in step S78).

Figure 25:
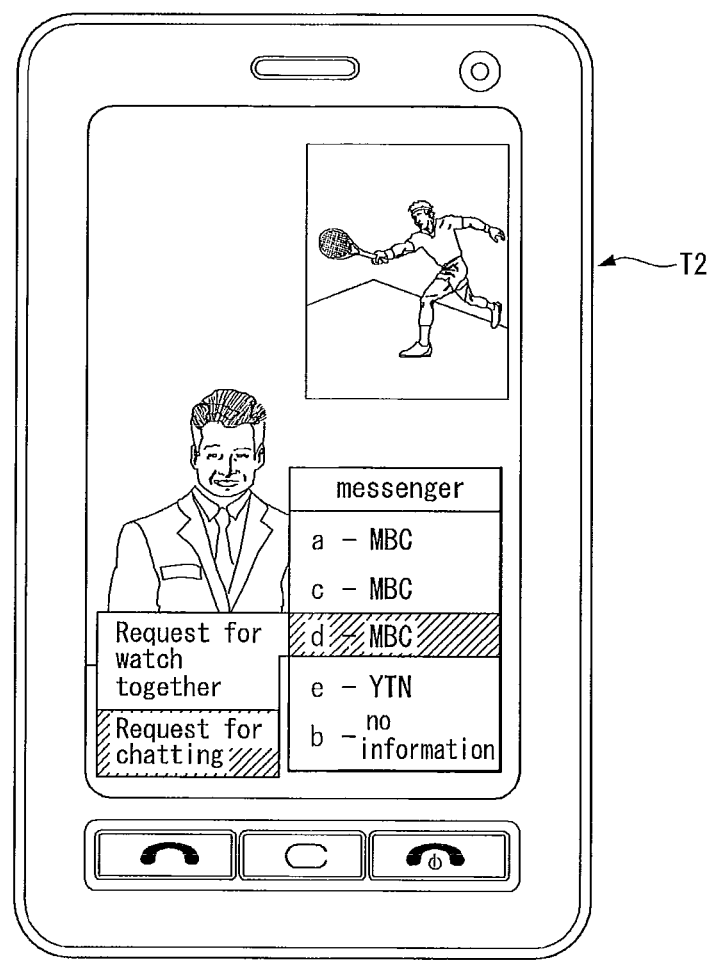
FIGS. 25-28 illustrate an operation of the mobile terminal according to the operation illustrated in FIG. 24.

Next, FIGS. 25-28 are overviews of display screens illustrating a chatting operation performed between the second and third mobile terminals T2 and T3. In more detail, FIG. 25 illustrates an option being displayed allowing the user to request a chatting session be established with another party (e.g., the user of the third mobile terminal T3).

Figure 26:
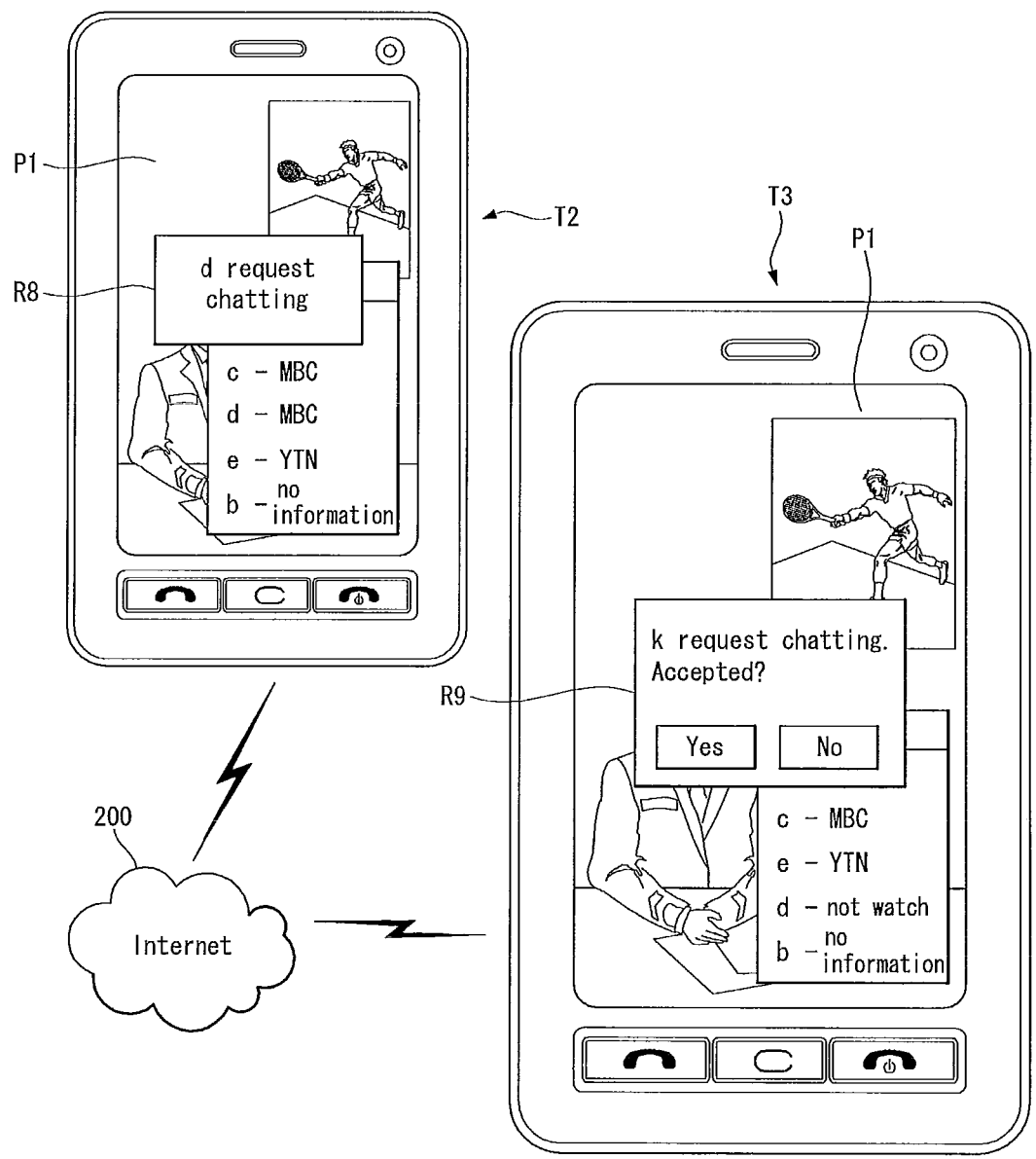
Figure 27:
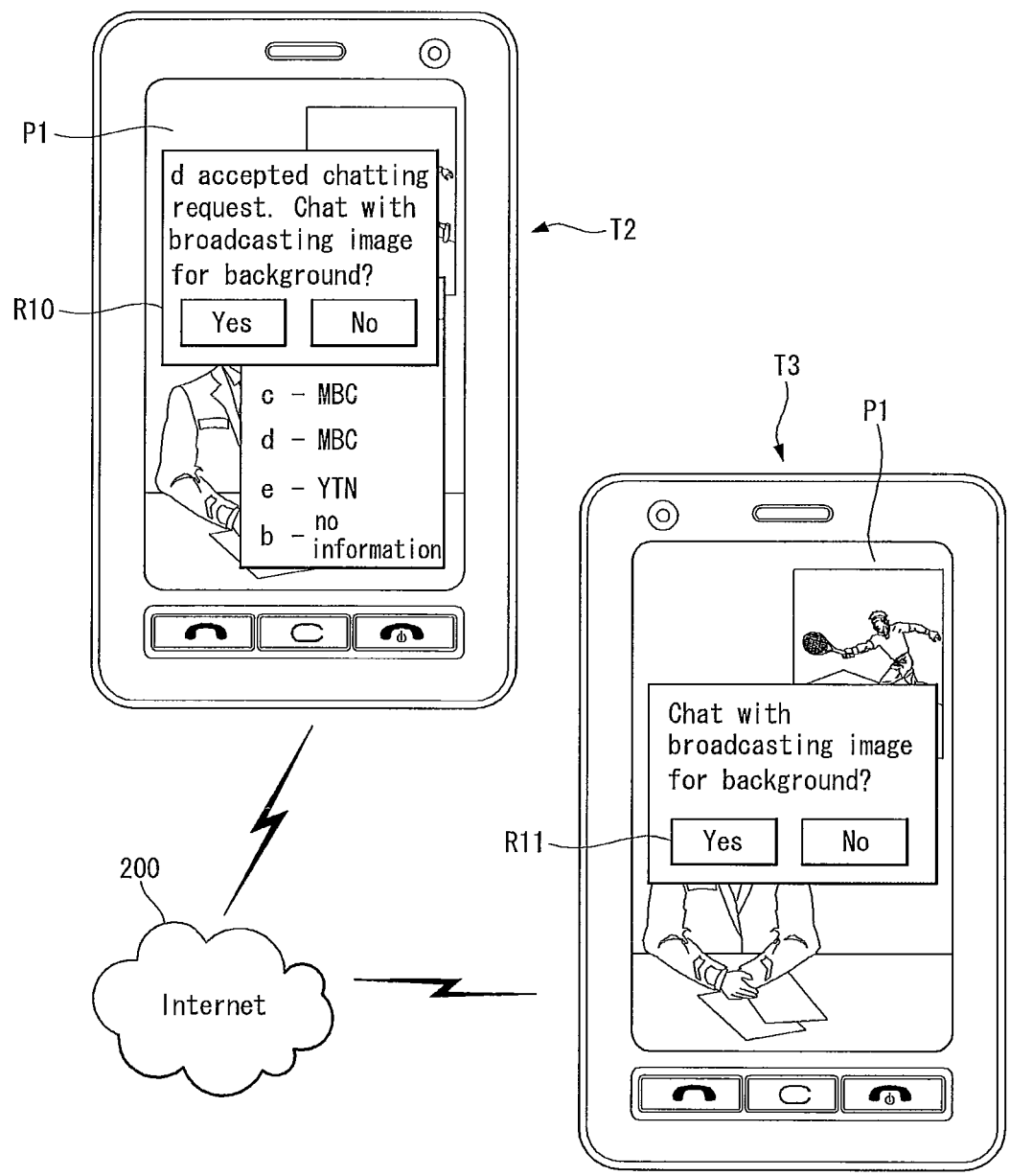

Then, as shown in FIG. 26, when the second mobile terminal T2 requests "d" to chat, a ninth pop-up window R9 asking the user of the terminal T3 to chat (the user "d"). As shown in FIG. 27, when the third mobile terminal T3 accepts the chatting request, tenth and eleventh pop-up windows R10 and R11 are respectively displayed on the second and third mobile terminals T2 and T3 asking whether the chatting session is to be performed with the displayed broadcasting image in a background.

Figure 28:
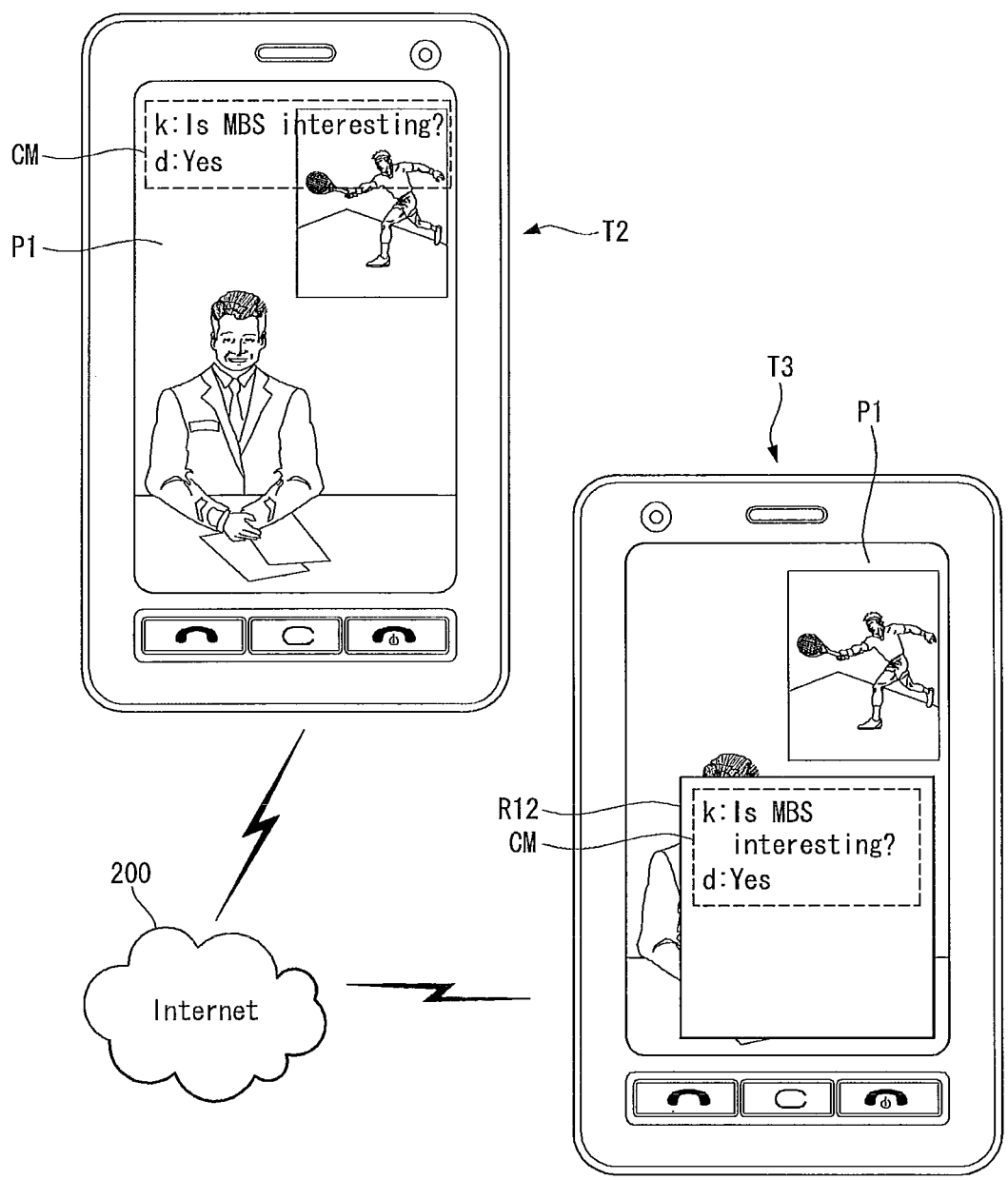

As shown in FIG. 28, the second mobile terminal T2 selects the chatting session be performed with the displayed broadcasting image in the background while the third mobile terminal T3 does not select the chatting session be performed with the displayed broadcasting image in the background. Further, when the chatting session is displayed with the displayed broadcasting image in the background, a chatting message CM is displayed in an overlapping manner with the displayed broadcasting program P1. When the chatting session is not displayed with the displayed broadcasting image in the background, a twelfth pop-up window R12 for chatting is displayed and the chatting message CM is displayed in the twelfth pop-up window R12.

Further, the transparency of the chatting message CM displayed on the displayed image of the broadcasting program P1 can be controlled through alpha blending. It is also possible to control the transparency of the chatting message CM such that characters of the chatting message CM are relatively less transparent to improve character recognition.

In addition, the present invention is also directed to multiple mobile terminals that can simultaneously perform the "watch together" feature and the chatting functions. For example, more than two terminals can be simultaneously perform the features of the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
   acquiring plural channel information of a broadcasting program of a plurality of mobile terminals communicating with the mobile terminal through an instant messaging client, wherein the instant messaging client is connected to a wireless internet through a wireless internet module, and wherein the plurality of mobile terminals are parties registered on the instant messaging client;
   displaying the plurality of mobile terminals being registered on the instant messaging client;
   displaying a current state of each the displayed plurality of mobile terminals, wherein the current state is based on the acquired plural channel information and comprises a channel name of the broadcast program and whether or not the broadcast program is being received;
   arranging the plurality of mobile terminals according to multiple specific standards;
   receiving a selection signal corresponding to a selection of at least one channel information item among the displayed plural channel information; and
   outputting the broadcasting program corresponding to the selected channel information item,
   wherein, in the arranging step, the registered plurality of mobile terminals are arranged to at least one group according to a first specific standard, and at least one of the mobile terminals included in each group are arranged according to a second specific standard, and
   wherein, in the outputting step, the broadcasting program is displayed in a background, at least two chatting messages are displayed in an overlapping manner with the displayed broadcast program, and at least two chatting messages are displayed relatively less transparent than the broadcasting program by controlling a transparency of the at least two chatting messages if a chatting session is performed.

2. The method of claim 1, wherein, in the acquiring step, the instant messaging client requests the at least one of mobile terminals to provide the channel information and acquires the channel information.

3. The method of claim 1, wherein the at least one specific standard indicates that the acquired plural channel information is to be arranged based on at least one of a channel name of the broadcast program, a channel number name of the broadcast program, a program title name of the broadcast program, detailed information name of the broadcast program and whether or not the broadcast program is received by the at least one of mobile terminals.

4. The method of claim 1, wherein the broadcasting program is received through one of the wireless internet and a digital broadcasting network.

5. The method of claim 1, further comprising:
   displaying a chatting message transmitted/received to/from the at least one of mobile terminals.

6. The method of claim 1, further comprising:
   controlling a transparency of a display region displaying the acquired plural channel information.

7. The method of claim 1, further comprising:
   transmitting the selected channel information to at least one other mobile terminal that is not receiving the broadcasting program.

8. The method of claim 1, further comprising:
   displaying detailed information of the received broadcasting program, wherein the detailed information comprises a broadcasting time and title.

9. A mobile terminal, comprising:
   a wireless internet module configured to connect to the Internet;
   a controller configured to acquire plural channel information of a broadcasting program of a plurality of mobile terminals communicating with the mobile terminal through an instant messaging client, wherein the instant messaging client is connected to a wireless internet through a wireless internet module, and wherein the plurality of mobile terminals are parties registered on the instant messaging client;
   a display unit configured to display the plurality of mobile terminals being registered on the instant messaging client, display a current state of each the displayed plurality of mobile terminals, wherein the current state is based on the acquired plural channel information and comprises a channel name of the broadcast program and whether or not the broadcast program is being received, and arrange the acquired plural channel information according to multiple specific standards; and
   an input unit configured to select at least one channel information item from the displayed plural channel information,
   wherein the controller is further configured to receive the broadcasting program corresponding to the selected channel information item and to control the display unit to display the broadcasting program,
   wherein the controller is configured to arrange the registered plurality of mobile terminals to at least one group according to a first specific standard, and to arrange at least one of the mobile terminals included in each group according to a second specific standard,
   wherein the display unit is configured to display the arranged at least one of the mobile terminals and the channel information corresponding to the at least one of mobile terminals, and
   wherein the display unit is configured to display the broadcasting program in a background display at least two chatting messages in an overlapping manner with the displayed broadcast program, and display the at least two chatting messages relatively less transparent than the broadcasting program by controlling a transparency of the at least two chatting messages if a chatting session is performed.

10. The mobile terminal of claim 9, wherein the controller is further configured to control the client program to request the at least one of mobile terminals to provide the channel information and to acquire the channel information.

11. The mobile terminal of claim 9, wherein the at least one specific standard indicates that the acquired plural channel information is to be arranged based on at least one of a channel name of the broadcast program, a channel number name of the broadcast program, a program title name of the broadcast program, detailed information name of the broadcast program and whether or not the broadcast program is received by the at least one of mobile terminals.

12. The mobile terminal of claim 9, wherein the controller is further configured to receive the broadcasting program through one of the wireless internet and a digital broadcasting network.

13. The mobile terminal of claim 9, wherein the display unit is further configured to display a chatting message transmitted/received to/from the at least one of mobile terminals.

14. The mobile terminal of claim 9, wherein the controller is further configured to control a transparency of a display region displaying the acquired plural channel information.

15. The mobile terminal of claim 9, further comprising:
a transmitting unit configured the selected channel information to at least one other mobile terminal that is not receiving the broadcasting program.

\* \* \* \* \*